United States Patent
Patel et al.

(10) Patent No.: US 11,379,577 B2
(45) Date of Patent: Jul. 5, 2022

(54) UNIFORM RESOURCE LOCATOR SECURITY ANALYSIS USING MALICE PATTERNS

(71) Applicant: Microsoft Technology Licensing, LLC, Redmond, WA (US)

(72) Inventors: Amar D. Patel, Issaquah, WA (US); Ravi Chandru Shahani, Bellevue, WA (US); Revanth Rameshkumar, Redmond, WA (US); Ethan Jacob Holland, Rockville, MD (US); Douglas J. Hines, Kenmore, WA (US); Abhijeet Surendra Hatekar, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 342 days.

(21) Appl. No.: 16/584,658

(22) Filed: Sep. 26, 2019

(65) Prior Publication Data
US 2021/0097168 A1   Apr. 1, 2021

(51) Int. Cl.
*H04L 29/06* (2006.01)
*G06F 21/53* (2013.01)
(Continued)

(52) U.S. Cl.
CPC .......... *G06F 21/53* (2013.01); *G06F 9/45558* (2013.01); *G06F 21/54* (2013.01);
(Continued)

(58) Field of Classification Search
CPC ........ G06F 21/53; G06F 21/54; G06F 21/566; G06F 2221/2119; H04L 63/14; H04L 63/0236
(Continued)

(56) References Cited

U.S. PATENT DOCUMENTS 10,404,747 B1   9/2019 Sela et al.
10,778,702 B1 *  9/2020 Huang ................ H04L 41/147
(Continued)

FOREIGN PATENT DOCUMENTS

WO   2014035988 A1   3/2014

OTHER PUBLICATIONS

Hirotomo, et al., "Efficient Method for Analyzing Malicious Websites by Using Multi-Environment Analysis System", In Proceedings of 12th Asia Joint Conference on Information Security, Aug. 10, 2017, pp. 48-54.
(Continued)

*Primary Examiner* — Longbit Chai
(74) *Attorney, Agent, or Firm* — Ogilvie Law Firm

(57) ABSTRACT

Cybersecurity enhancements help avoid malicious Uniform Resource Locators (URLs). Embodiments may reduce or eliminate reliance on subjective analysis or detonation virtual machines. URL substrings are automatically analyzed for maliciousness using malice patterns. Patterns may test counts, lengths, rarity, encodings, and other inherent aspects of URLs. URLs may be analyzed individually, or in groups to detect shared portions, or both. URL analysis may use or avoid machine learning, and may use or avoid lookups. Malice patterns may be used individually or in combinations to detect malicious URLs. Analysis results may enhance security through blocking use of suspect URLs, flagging them for further analysis, or allowing their validated use, for instance. Analysis results may also be fed back to further train a machine learning model or a statistical model.

20 Claims, 4 Drawing Sheets

| SOME MALICE PATTERNS 502 | | |
|---|---|---|
| PUNYCODE 702 DOMAIN 704 | MANY SUBDOMAINS 716 | QUERY PATH 728 |
| HOMOGLYPH 706 DOMAIN 708 | MANY DIRECTORIES 718 | QUERY PARAMETER 730 |
|  | LONG DOMAIN 720 | DOMAIN GENERATION 732 |
| BASE64 710 ENCODING 712 | LONG SUBDOMAIN 722 | INFERRED 406 |
|  | ATYPICAL BRANDING 724 | SENSITIVE KEY WORDS 734 |
| UNEXPECTED LANGUAGE 714 | TYPO SQUATTING 726 | UNLIKELY STRING 736 |

(51) Int. Cl.
*G06N 20/00* (2019.01)
*G06F 9/455* (2018.01)
*G06F 21/54* (2013.01)
*G06F 21/56* (2013.01)
*G06K 9/62* (2022.01)

(52) U.S. Cl.
CPC ......... *G06F 21/566* (2013.01); *G06K 9/6256* (2013.01); *G06N 20/00* (2019.01); *G06F 2009/45587* (2013.01); *G06F 2009/45595* (2013.01); *G06F 2221/2119* (2013.01)

(58) Field of Classification Search
USPC .......................................................... 726/22
See application file for complete search history.

(56) References Cited

U.S. PATENT DOCUMENTS

| | | | |
|---|---|---|---|
| 11,005,839 | B1 | 5/2021 | Shahidzadeh et al. |
| 11,025,648 | B2 * | 6/2021 | Pereira ............... G06F 16/9024 |
| 2002/0099952 | A1 | 7/2002 | Lambert et al. |
| 2002/0143813 | A1 | 10/2002 | Jellum et al. |
| 2003/0182549 | A1 | 9/2003 | Hallin et al. |
| 2003/0204425 | A1 | 10/2003 | Kennedy et al. |
| 2004/0148170 | A1 | 7/2004 | Acero et al. |
| 2004/0162985 | A1 | 8/2004 | Freeman et al. |
| 2004/0164987 | A1 | 8/2004 | Aronson et al. |
| 2005/0021971 | A1 | 1/2005 | Patankar et al. |
| 2005/0122334 | A1 | 6/2005 | Boyd et al. |
| 2005/0210061 | A1 | 9/2005 | Chang et al. |
| 2005/0243094 | A1 | 11/2005 | Patel et al. |
| 2005/0251382 | A1 | 11/2005 | Chang et al. |
| 2005/0273335 | A1 | 12/2005 | Chang et al. |
| 2005/0273336 | A1 | 12/2005 | Chang et al. |
| 2005/0273771 | A1 | 12/2005 | Chang et al. |
| 2005/0289522 | A1 | 12/2005 | Chang et al. |
| 2007/0079358 | A1 | 4/2007 | Lambert et al. |
| 2007/0079372 | A1 | 4/2007 | Lambert et al. |
| 2007/0083912 | A1 | 4/2007 | Lambert et al. |
| 2008/0198169 | A1 | 8/2008 | Boyd et al. |
| 2008/0276316 | A1 * | 11/2008 | Roelker .............. H04L 63/0227 726/23 |
| 2009/0182550 | A1 | 7/2009 | Alonichau et al. |
| 2009/0281972 | A1 | 11/2009 | Shahani et al. |
| 2009/0320136 | A1 | 12/2009 | Lambert et al. |
| 2010/0153930 | A1 | 6/2010 | Lambert et al. |
| 2010/0185631 | A1 | 7/2010 | Caldwell et al. |
| 2010/0251380 | A1 * | 9/2010 | Zhang .................... G06F 21/31 726/26 |
| 2010/0306847 | A1 | 12/2010 | Lambert et al. |
| 2010/0325359 | A1 | 12/2010 | Goel et al. |
| 2010/0332601 | A1 | 12/2010 | Walter et al. |
| 2011/0154505 | A1 | 6/2011 | Cowan et al. |
| 2011/0191848 | A1 | 8/2011 | Zorn et al. |
| 2011/0234592 | A1 | 9/2011 | Patel et al. |
| 2011/0252476 | A1 | 10/2011 | Loveland et al. |
| 2011/0296524 | A1 | 12/2011 | Hines et al. |
| 2011/0302455 | A1 | 12/2011 | Thomas et al. |
| 2011/0314544 | A1 | 12/2011 | Shin et al. |
| 2012/0086715 | A1 | 4/2012 | Patel et al. |
| 2012/0158626 | A1 | 6/2012 | Zhu et al. |
| 2012/0271805 | A1 | 10/2012 | Holenstein et al. |
| 2013/0111587 | A1 | 5/2013 | Goel et al. |
| 2014/0122061 | A1 | 5/2014 | Van Caldwell et al. |
| 2014/0172813 | A1 | 6/2014 | Yan et al. |
| 2014/0237607 | A1 | 8/2014 | Lambert et al. |
| 2014/0365443 | A1 | 12/2014 | Goel et al. |
| 2014/0368523 | A1 | 12/2014 | Patel et al. |
| 2015/0006159 | A1 | 1/2015 | Cai et al. |
| 2015/0091931 | A1 | 4/2015 | Pelton et al. |
| 2015/0143525 | A1 | 5/2015 | Naldurg et al. |
| 2015/0172311 | A1 | 6/2015 | Freedman et al. |
| 2015/0326521 | A1 | 11/2015 | Osipkov et al. |
| 2016/0071230 | A1 | 3/2016 | Patel et al. |
| 2016/0071315 | A1 | 3/2016 | Cohen et al. |
| 2016/0173434 | A1 | 6/2016 | Midgen et al. |
| 2016/0191548 | A1 | 6/2016 | Smith et al. |
| 2017/0061662 | A1 | 3/2017 | Pelton et al. |
| 2017/0109259 | A1 | 4/2017 | Lewis et al. |
| 2017/0109379 | A1 | 4/2017 | Crawford et al. |
| 2017/0109380 | A1 | 4/2017 | Crawford et al. |
| 2017/0109927 | A1 | 4/2017 | Patel et al. |
| 2017/0187782 | A1 | 6/2017 | Crawford et al. |
| 2017/0373943 | A1 | 12/2017 | Goel et al. |
| 2018/0095805 | A1 | 4/2018 | Patel et al. |
| 2018/0205691 | A1 | 7/2018 | Osipkov et al. |
| 2018/0213000 | A1 | 7/2018 | Patel et al. |
| 2018/0248904 | A1 | 8/2018 | Villella et al. |
| 2018/0367548 | A1 | 12/2018 | Stokes et al. |
| 2019/0028557 | A1 | 1/2019 | Modi et al. |
| 2019/0272664 | A1 | 9/2019 | Kinross et al. |
| 2020/0027190 | A1 | 1/2020 | Kinross et al. |
| 2020/0076837 | A1 | 3/2020 | Ladnai et al. |
| 2020/0311766 | A1 | 10/2020 | Shiravi Khozani et al. |
| 2021/0306375 | A1 | 9/2021 | Patel et al. |

OTHER PUBLICATIONS

Nazario, Jose, "PhoneyC: A Virtual Client Honeypot", In Proceedings of the 2nd USENIX Conference on Large-Scale Exploits and Emergent Threats: Botnets, Spyware, Worms, and More, Apr. 1, 2009, 8 Pages.
"Invitation To Pay Additional Fees issued in PCT Application No. PCT/US21/016270", Mailed Date: Apr. 30, 2021, 14 Pages.
"Adaptive Clientless Rendering", Retrieved From: https://www.menlosecurity.com/adaptive-clientless-rendering, Retrieved Date: Mar. 4, 2020, 5 Pages.
"ANY.RUN—Interactive Online Malware Sandbox", Retrieved From: https://web.archive.org/web/20191231113835/https://any.run/, Dec. 31, 2019, 6 Pages.
"Cyren Sandboxing", Retrieved From: https://www.cyren.com/tl_files/downloads/resources/Cyren_Datasheet_SaaSSandboxing_20180308_ltr_EN_web.pdf, Mar. 8, 2018, 2 Pages.
Remington, Darren, "Cloudflare+Remote Browser Isolation", Retrieved From: https://blog.cloudflare.com/cloudflare-and-remote-browser-isolation/, Jan. 7, 2020, 16 Pages.
"Free Online Sandbox FAQ", Retrieved From: https://www.splunk.com/en_us/products/premium-solutions/splunk-enterprise-security/online-sandbox-faq.html, Retrieved Date: Feb. 24, 2020, 3 Pages.
"Gather Any Web Data, from Any Website", Retrieved From: https://luminati.io/. Retrieved Date: Mar. 28, 2020, 9 Pages.
"Honeypot (computing)", Retrieved From: https://en.wikipedia.org/wiki/Honeypot_(computing), Feb. 26, 2020, 6 Pages.
Roccia, et al., "Evolution of Malware Sandbox Evasion Tactics—A Retrospective Study", Retrieved From: https://www.mcafee.com/blogs/other-blogs/mcafee-labs/evolution-of-malware-sandbox-evasion-tactics-a-retrospective-study/, Sep. 9, 2019, 19 Pages.
Waterman, Shaun, "Isolating Browsers from the Web's 'Cesspool': Why Symantec Bought FireGlass", Retrieved From: https://www.cyberscoop.com/symantec-fireglass-browser-isolation/, Jul. 10, 2017, 10 Pages.
"Proofpoint—PP-M-PWD-S-A-105—Pfpt Personal Webmail Def-s 1001 To 2000 12", Retrieved From: https://www.neobits.com/proofpoint_pp_m_pwd_s_a_105_pfpl_personal_webmail_p12232805.html. Retrieved Date: Mar. 4, 2020, 3 Pages.
"Proofpoint Browser Isolation", Retrieved From: https://www.proofpoint.com/sites/default/files/pfpt-us-ds-browser-isolation.pdf, Nov. 2019, 2 Pages.
"Proofpoint Security and Compliance Price List", Retrieved From: https://www.cybersecuritypricing.org/proofpoint-security-and-compliance-price-list/, Retrieved Date: Mar. 4, 2020, 1 Page. (excerpt).
"Proxify Services", Retrieved From: https://proxify.com/services.shtml, Retrieved Date: Mar. 6, 2020, 1 Page.
"Request for Information (RFI) for Cloud Based Internet Isolation Solution", Request From: https://insidecybersecurity.com/sites/insidecybersecurity.com/files/documents/2018/aug/cs2018_0376.pdf, Aug. 2018, 4 Pages.

(56) References Cited

OTHER PUBLICATIONS

"Security Information and Event Management", Retrieved From: https://en.wikipedia.org/wiki/Security_information_and_event_management, Feb. 12, 2020, 4 Pages.

"Symantec Full Web Isolation—Initial Cloud Service Subscription (1 year) +", Retrieved From: https://www.cdw.com/product/Symantec-Full-Web-Isolation-Initial-Cloud-Service-Subscription-1-year/4877965, Retrieved Date: Mar. 4, 2020, 3 Pages.

Skulkin, et al., "An Overview of Web Browser Forensics", Retrieved From: https://www.digitalforensics.com/blog/an-overview-of-web-browser-forensics/, Retrieved Date: Mar. 4, 2020, 14 Pages.

"Understanding IP Address Geolocation", Retrieved From: https://support.authentic8.com/support/solutions/articles/16000027683-understanding-ip-address-geolocation, Apr. 18, 2019, 5 Pages.

"User Guide: TrustedProxies GeoSet Toolbar", Retrieved From: https://customers.trustedproxies.com/index.php?rp=/knowledgebase/42/User-Guide-TrustedProxies-GeoSet-Toolbar.html, Retrieved Date: Mar. 6, 2020, 9 Pages.

"Web Isolation", Retrieved From: https://www.broadcom.com/products/cyber-security/web-and-email/gateway/web-isolation, Retrieved Date: Mar. 4, 2020, 4 Pages.

Bule, Guise, "Remote Browser Isolation—A Guide To The Vendors In The Market", Retrieved From: https://www.secjuice.com/remote-browser-isolation-vendors/, Jun. 28, 2018, 11 Pages.

Halfin, et al., "Enable SIEM Integration in Microsoft Defender ATP", Retrieved From: https://docs.microsoft.com/en-us/windows/security/threat-protection/microsoft-defender-atp/enable-siem-integration, Dec. 10, 2019, 4 Pages.

Viegas, Rohan, "How Malware Sandboxes and SIEMs Work in Tandem to Effectively Detect Malware", Retrieved From: https://cybersecurity.att.com/blogs/security-essentials/how-malware-sandboxes-and-siems-work-in-tandem-to-effectively-detect-malware, Dec. 27, 2018, 3 Pages.

"What is Sandboxing?", retrieved from <<https://www.barracuda.com/glossary/sandboxing>>, no later than Aug. 22, 2019, 4 pages.

"Domain generation algorithm", retrieved from <<https://en.wikipedia.org/wiki/Domain_generation_algorithm>>, Jul. 2, 2019, 3 pages.

"Evolving Office 365 Advanced Threat Protection with URL Detonation and Dynamic Delivery", retrieved from <<https://www.microsoft.com/en-us/microsoft-365/blog/2017/01/25/evolving-office-365-advanced-threat-protection-with-url-detonation-and-dynamic-delivery/>>, Jan. 25, 2017, 11 pages.

"Punycode", retrieved from <<https://en.wikipedia.org/wiki/Punycode>>, May 1, 2019, 4 pages.

"Homoglyph", retrieved from <<https://en.wikipedia.org/wiki/Homoglyph>>, Aug. 27, 2019, 4 pages.

Brian Krebs, "Look-Alike Domains and Visual Confusion", retrieved from <<https://krebsonsecurity.com/2018/03/look-alike-domains-and-visual-confusion/>>, Mar. 8, 2018, 18 pages.

"How to check whether a string is base64 encoded or not", retrieved from <<https://stackoverflow.com/questions/8571501/how-to-check-whether-a-string-is-base64-encoded-or-not>>, Aug. 30, 2018, 20 pages.

Ebubekir Büber, "Phishing URL Detection with ML", retrieved from <<https://towardsdatascience.com/phishing-domain-detection-with-ml-5be9c99293e5>>, Feb. 8, 2018, 14 pages.

Doyen Sahoo, et al., "Malicious URL Detection using Machine Learning: A Survey", retrieved from <<https://arxiv.org/pdf/1701.07179.pdf>>. Aug. 2019, 37 pages.

Hyrum Anderson, et al., "Using Deep Learning To Detect DGAs", retrieved from <<https://www.endgame.com/blog/technical-blog/using-deep-learning-detect-dgas>>, Nov. 18, 2016, 13 pages.

Woodbridge, et al., "Predicting Domain Generation Algorithms with Long Short-Term Memory Networks", retrieved from <<https://www.covert.io/research-papers/deep-learning-security/Predicting%20Domain%20Generation%20Algorithms%20with%20Long%20Short-Term%20Memory%20Networks.pdf>>, Nov. 2, 2016, 13 pages.

H. Salgado, 'The "hxxp" and "hxxps" URI Schemes', retrieved from <<https://tools.ietf.org/id/draft-salgado-hxxp-01.xml>>, 2017, 7 pages.

"Regular expression", retrieved from <<https://en.wikipedia.org/wiki/Regular_expression>>, Sep. 18, 2019, 29 pages.

"Context-free grammar", retrieved from <<https://en.wikipedia.org/wiki/Context-free_grammar>>, Sep. 5, 2019, 18 pages.

"String metric", retrieved from <<https://en.wikipedia.org/wiki/String_metric>>, Jun. 3, 2019, 3 pages.

"Markov chain", retrieved from <<https://en.wikipedia.org/wiki/Markov_chain>>, Sep. 13, 2019, 27 pages.

Mamun, et al., "Detecting Malicious URLs Using Lexical Analysis", In International Conference on Network and System Security, Sep. 21, 2016, pp. 467-482.

"International Search Report and Written Opinion Issued in PCT Application No. PCT/US20/038275", dated Sep. 14, 2020, 12 Pages.

Rao, et al., "CatchPhish: detection of phishing websites by inspecting URLs", In Journal of Ambient Intelligence and Humanized Computing, vol. 11, Issue 2, May 10, 2019, pp. 813-825.

"International Search Report and Written Opinion Issued in PCT Application No. PCT/US21/016270", dated Jun. 21, 2021, 19 Pages.

"Notice of Allowance Issued in U.S. Appl. No. 16/835,382", dated May 2, 2022, 11 Pages.

Ahmed, et al., "An Automated User Transparent Approach to log Web URLs for Forensic Analysis", In Proceedings of the Fifth International Conference on IT Security Incident Management and IT Forensics, Sep. 15, 2009, pp. 120-127.

Ieong, et al., "Deriving Cse-specific Live Forensics Investigation Procedures from FORZA", In Proceedings of the ACM Symposium on Applied computing, Mar. 11, 2007, pp. 175-180.

Kelly, et al., "FIRST: Forensic Internet Replay Sequencing Tool", In Proceedings of the Eighth IEEE International Symposium on Network Computing and Applications, Jul. 9, 2009, pp. 270-273.

* cited by examiner

US 11,379,577 B2

UNIFORM RESOURCE LOCATOR SECURITY ANALYSIS USING MALICE PATTERNS

BACKGROUND

Web pages and many other online resources are identified using Uniform Resource Locators (URLs), which are sometimes also called "hyperlinks" or simply "links". URLs can be seen in the address bar of a web browser, or using other tools. Following a link—that is, navigating to the location identified in the link—is often both safe and useful, but not always. Following unsafe links can lead to malware infections, phishing sites, losses from fraud, misuse of computing resources, and other undesirable results. Accordingly, effective and efficient computational tools and techniques for detecting unsafe URLs can significantly improve the security, reliability, and usability of computing systems.

Incidentally, "URL" is sometimes pronounced to rhyme with "pearl" and sometimes pronounced as a sequence of letters U-R-L. Either pronunciation may be used with the present disclosure.

SUMMARY

Some embodiments described in this document provide improved performance of computing system cybersecurity controls. In particular, some embodiments provide Uniform Resource Locators (URL) security analysis tools or techniques which can supplement or replace subjective URL analysis or URL analysis using detonation virtual machines, for example. URL substrings are automatically analyzed for maliciousness using one or more specified malice patterns which are described herein.

Some URL security analysis embodiments described herein include or are in operable communication with a memory and a processor. The processor is in operable communication with the memory, and is configured to perform URL security analysis steps which include (a) obtaining a URL substring, (b) automatically comparing the URL substring to at least one malice pattern, (c) assigning a maliciousness risk indicator to the URL substring based on a result of the comparing, thereby making the URL substring an analyzed URL substring, and (d) enhancing security of a guarded system based on at least the maliciousness risk indicator. Security enhancement may be accomplished, for example, by disallowing use of the analyzed URL substring by the guarded system when the maliciousness risk indicator places the analyzed URL substring in a high risk category, or by allowing use of the analyzed URL substring by the guarded system when the maliciousness risk indicator places the analyzed URL substring in a low risk category, or by feeding the analyzed URL substring and the maliciousness risk indicator back into the embodiment as at least a partial basis for security analysis of at least one other URL substring. A URL "substring" is the entire text of the URL, or any non-empty portion thereof. The malice pattern(s) to which the URL substring is compared may include one or more patterns described herein as examples, or any other malice pattern consistent with the teachings provided in this disclosure.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
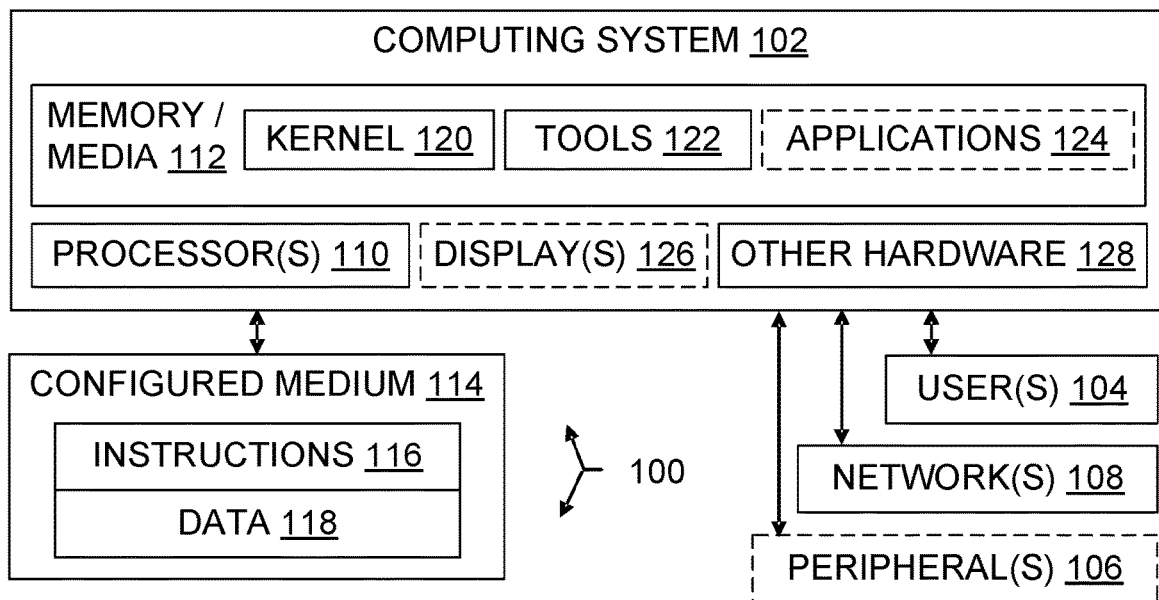
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges faced by Microsoft innovators who were working to improve the security of Microsoft Azure® cloud offerings (mark of Microsoft Corporation). In addition to providing commercial Azure® offerings, Microsoft is itself a user of many Azure® solutions. Hence, Microsoft is doubly motivated to monitor and improve Azure® cloud security, both on behalf of Microsoft customers and to help Microsoft in the protection of Microsoft's own cloud resources and tools.

In particular, a technical challenge was to how to effectively and efficiently identify malicious URLs. Typically, malicious URLs have been identified through human analysis or by using a URL detonation system. As explained below, however human analysis and detonation analysis have disadvantages, so an emergent technical challenge was to how to effectively and efficiently identify malicious URLs in an automated manner at scale without human review of each URL and without a detonation of each URL. As used here, "at scale" means one hundred or more URLs are analyzed per minute.

Human analysis of URLs is a subjective operation, in which a human looks at URLs for suspicious traits such as resemblance to any widely recognized non-malicious URL. The URL "white-house.gov.ly", for example, resembles the official URL of the United States White House, but is not the same as the official URL and it does not necessarily lead to the same online location as the official URL. A challenge with human analysis is that it tends to be relatively slow, labor intensive, and costly on a per URL basis. It also lacks consistency, because it relies on subjective judgments.

With a URL detonation system, a URL is analyzed inside of an isolated sandbox detonation virtual machine. Using a virtual machine limits damage from following the URL if the URL happens to be malicious. The URL is "detonated" (metaphorically) by following it from inside the virtual machine to the location it identifies, and gathering information about the results of following it. During the detonation process, information is gathered about the URL, redirect chains, and landing pages, for example. This information may then be transformed into features which are fed into heuristic or machine learning models to make a determination as to whether the URL is good or bad. A benefit of URL detonation is that it doesn't require a human review of the URL and automates the URL analysis. However, URL detonation is still higher in cost than a static analysis done according to teachings herein, due to the greater compute and storage resource consumption of URL detonation on a per URL basis.

A benefit of static analysis as taught herein is that a human is not required and a detonation VM is not required to conduct the analysis. That is, reliance on human review and reliance on detonation are each avoided. These reliance avoidances translate into lower cost on a per URL basis, and into less delay in rendering a high confidence verdict on a per URL basis, particularly at scale. Although avoidance of human URL review and detonation are benefits of the teachings in some scenarios, one of skill will recognize that the teachings provided herein have beneficial applicability to many other scenarios as well.

Static URL analysis according to teachings presented herein considers the structure and content per se of a URL, as opposed to following the URL to see what happens. One basic structure of a URL is: protocol://subdomain-name.domain-name.domain-extension/path?query#fragment. Some examples of familiar protocols are http, https, and ftp. Many examples of URLs are provided and discussed herein. For security, however, the examples largely use the non-navigable obfuscating protocol hxxps, so that example URLs herein are not accidentally made into live navigable links.

As taught herein, malice patterns may be defined using, e.g., the length of a domain name, the number of subdomains in the URL, some unexpected or suspicious character sequences or encodings, suspicious patterns in the domain names of multiple URLs that indicate automatically generated domain names, and other characteristics that can be recognized and tested without navigating the URL. Some of the malice patterns can be recognized from an URL itself. Some malice patterns require the use of a dictionary, e.g., a key words dictionary or a brand strings dictionary, but still do not require navigating the URL. Some malice patterns look at one URL at a time, while others look for suspect patterns in a set of URLs. Some malice patterns utilize a machine learning model, while others do not. All of them may be used alone, or in combination with one or more other malice patterns, or as a supplement or a replacement for subjective analysis or detonation analysis.

Although Uniform Resource Locators (URLs) are discussed in many examples herein, one of skill will acknowledge that URLs are a subset of Uniform Resource Identifiers (URIs) and that the teachings provided herein may also be applied to perform security analysis of URIs. Indeed, unless specifically stated otherwise, references to URLs in the specification text, drawings, or claims of the present disclosure should be understand to encompass URIs and URI substrings as well. Likewise, except to the extent that doing so would be contrary to facts understood by one of skill, any reference in the specification text, drawings, or claims of this disclosure to URLs should be understand to also encompass URIs and URI substrings.

Some embodiments described herein may be viewed by some people in a broader context. For instance, concepts such as categorization, comparison, guards, risk, and patterns may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to assess URL maliciousness risks at scale in a computing system. Other configured storage media, systems, and processes involving categorization, comparison, guards, risk, or patterns are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular motivating examples, actions, responses, scenarios, malicious URLs, operating systems, software development environments, encoding formats, software processes, development tools, identifiers, files, data structures, notations, control flows, pseudocode, naming conventions, resource types, network protocols, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as communications between a local user device and a remote service device in a cloud or other computer network, hyperlink navigation, and hyperlink safety analysis, which are each activities deeply rooted in computing technology. Some of the technical mechanisms discussed include, e.g., URLs, virtual machines, machine learning models, regular expressions, domain name generators, digital dictionaries, encodings, and malice pattern comparison software. Some of the technical effects discussed include, e.g., assignment of maliciousness risk indicators to URL substrings, allowance of URL substring usage in a computing system, disallowance of URL substring usage in a computing system, and tuning of a URL security analysis system through feedback and machine learning using URL substrings previously analyzed by the URL security analysis system. Thus, purely mental processes are clearly excluded. Some embodiments improve the functioning of computing systems and services by enhancing security through a "static" URL security analysis, that is to say, a detonation-free URL security analysis, which is also less computationally expensive than detonation analysis on a per-URL basis. Other advantages based on the technical characteristics of the teachings will also be apparent to one of skill from the description provided.

Note Regarding Hyperlinks

This disclosure may contain various URIs, URLs, hyperlinks, IP addresses, and/or other items which might be considered browser-executable codes. These items are included in the disclosure merely as a courtesy, rather than being included to reference the contents of the web sites or files that they identify as necessary support for the description of embodiments. Applicant does not intend to have these URIs, URLs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01 (VII).

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
ANSI: American National Standards Institute
API: application program interface
ASCII: American Standard Code for Information Interchange
BIOS: basic input/output system
CD: compact disc
CPU: central processing unit
DVD: digital versatile disk or digital video disc
FPGA: field-programmable gate array
FPU: floating point processing unit
FQDN: fully qualified domain name
GPU: graphical processing unit
GUI: graphical user interface
GUID: globally unique identifier
HTTP: hypertext transfer protocol
HTTPS: hypertext transfer protocol secure
IaaS or IAAS: infrastructure-as-a-service
ID: identification or identity
IDE: integrated development environment
IoT: internet of things
IP: internet protocol
LAN: local area network
OS: operating system
PaaS or PAAS: platform-as-a-service
RAM: random access memory
REGEX: regular expression
ROM: read only memory
SIEM: security information and event management; also refers to tools which provide security information and event management
TCP: transport control protocol
TLS: transport layer security
Typo: typographical error
UDP: user datagram protocol
UEFI: Unified Extensible Firmware Interface
URI: uniform resource identifier
URL: uniform resource locator
VM: virtual machine
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Service" means a consumable program offering, in a cloud computing environment or other network or computing system environment, which provides resources to multiple programs or provides resource access to multiple programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. URL security analysis operations such as digital dictionary lookups, encoding detection, rarity calculations, machine learning model I/O, substring detection and quantification at scale, and many other operations discussed herein, are understood to be inherently digital. A human mind cannot interface directly with a CPU or other processor, or with RAM or other digital storage, to read and write the necessary data to perform the URL security analysis steps taught herein. This would all be well understood by persons of skill in the art in view of the present disclosure, but other people may sometimes need to be informed of this, or reminded of it.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/

Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as allowing, analyzing, applying, ascertaining, assigning, associating, calculating, comparing, computing, creating, defining, determining, disallowing, displaying, enhancing, feeding, finding, generating, getting, indicating, inferring, locating, obtaining, operating, performing, placing, providing, reducing, relying, residing, training, tuning, using, utilizing (and allows, allowed, analyzes, analyzed, etc.) with regard to a destination or other subject may involve intervening action such as forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as computational system or computing system 104 users 106 peripherals 108 network generally, including, e.g., LANs, WANs, software defined networks, clouds, and other wired or wireless networks 110 processor 112 computer-readable storage medium, e.g., RAM, hard disks 114 removable configured computer-readable storage medium 116 instructions executable with processor; may be on removable storage media or in other memory (volatile or non-volatile or both)

118 data 120 kernel(s), e.g., operating system(s), BIOS, UEFI, device drivers 122 tools, e.g., anti-virus software, firewalls, packet sniffer software, intrusion detection systems, intrusion prevention systems, debuggers, profilers, compilers, interpreters, decompilers, assemblers, disassemblers, source code editors, autocompletion software, simulators, fuzzers, repository access tools, version control tools, optimizers, collaboration tools, software development tools and tool suites (including, e.g., integrated development environments), hardware development tools and tool suites, diagnostics, and so on 124 applications, e.g., word processors, web browsers, spreadsheets, games, email tools, commands 126 display screens, also referred to as "displays"

128 computing hardware not otherwise associated with a reference number 106, 108, 110, 112, 114

200 client system, such as an end-user system 102

202 URL 204 cloud 206 server 208 service 210 guarded system, namely, any system that provides or uses URLs that are subject to URL analysis 212 URL security analysis, i.e., the act of analyzing a URL by comparing it to one or more malice patterns; may also be referred to simply as "URL analysis"

300 aspects of URL or URL analysis 302 file in which URL originated, at least as far as URL analysis is concerned 304 file type, e.g., text document, executable file, script file, etc.

306 service in which URL originated, at least as far as URL analysis is concerned 308 maliciousness risk indicator; may be, e.g., a numeric score or a Boolean verdict 310 maliciousness risk score; an example of a maliciousness risk indicator; may assume any of three or more values, e.g., 0.7 on a scale from 0.0 to 1.0

312 maliciousness risk verdict; an example of a maliciousness risk indicator; may assume either of two values, e.g. "safe" or "unsafe"

314 substring; a substring of a string S is S or any non-empty portion of S; a URL substring is thus the URL or any non-empty portion of the URL; in some embodiments all characters of a substring are contiguous, but in other embodiments non-contiguity is supported via wildcards, regular expressions, or other pattern matching, e.g., to catch suspect URLs such as m.i.cro-soft.com 316 character set, e.g., Unicode 318 natural language, e.g., English, Spanish, Japanese, Chinese, German, etc.

320 file system directory 322 count of directories 320 in an URL substring; the same directory name may appear more than once and thus get counted more than once 324 subdomain in a URL; may also be referred to as "sub-domain"

326 length of subdomain in characters 328 count of subdomains 324 in an URL substring; the same subdomain name may appear more than once and thus get counted more than once 330 domain in a URL 332 length of domain in characters 334 query path in URL 336 query parameter in URL 338 subjective human analysis of URL 340 detonation virtual machine 342 detonation analysis of URL 344 table 346 metric for calculating distance between strings, e.g., a Hamming metric or Levenshtein metric 400 URL security analysis system 402 URL security analysis software, e.g., software which performs one or more of the methods described herein, or implements recognition of one or more of the malice patterns described herein, or does both 404 predefined malice patterns, which do not rely on use of machine learning; a subset of malice patterns 502

406 inferred malice patterns, which rely on use of machine learning models or statistical models; a subset of malice patterns 502; reference numeral 406 also refers to the act of inferring the presence of a suspect URL substring, e.g., based on machine learning model output 408 syntax rule; may be defined, e.g., by a regular expression, context-free grammar production rules, or another lexical analyzer 410 list or other data structure containing URL substrings and associated risk indicators 412 threshold value generally; may also be referred to as a "cutoff"; may be set by default, by a user, or by an administrator; may be set using a statistical model or a machine learning model 414 machine learning model 416 interface to a network, e.g., a network interface card plus a network protocol stack 500 characterization of a malice pattern or a group of malice patterns 502 malice patterns generally 504 objective malice pattern, which does not rely on subjective analysis 338

506 static malice pattern, which does not rely on detonation analysis 342

Figure 8:
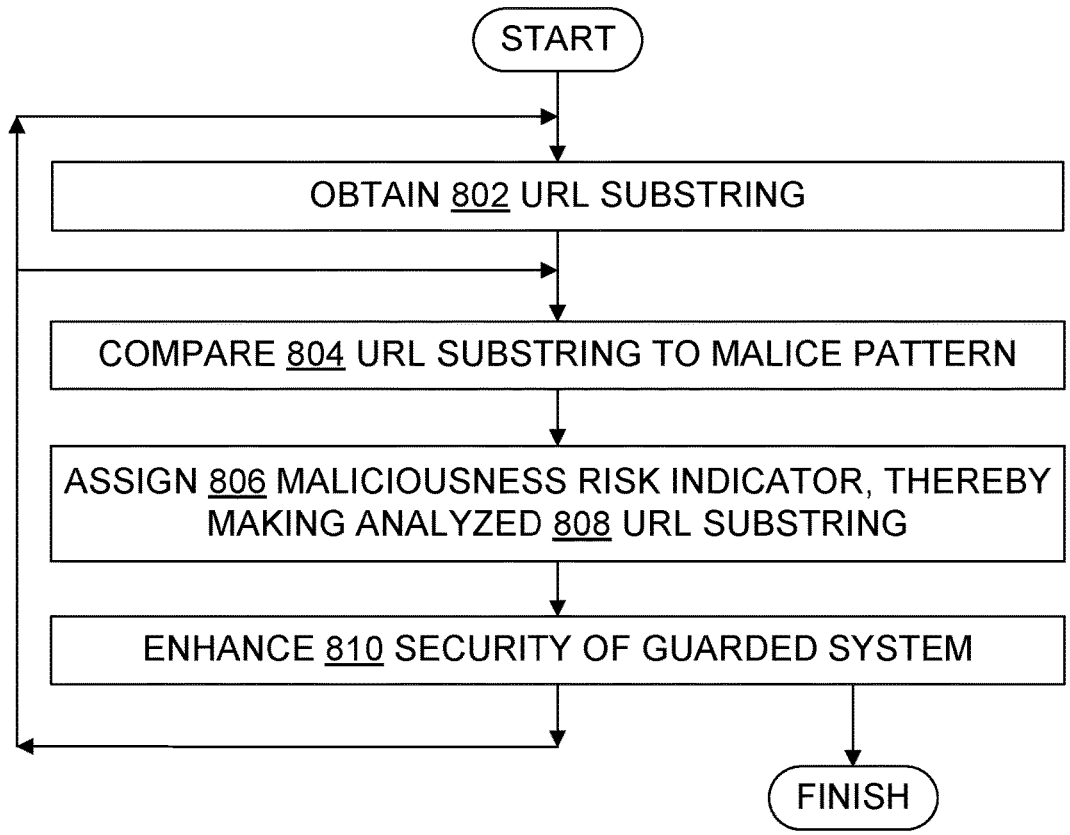
FIG. 8 is a flowchart illustrating steps in some URL security analysis methods.
Figure 9:
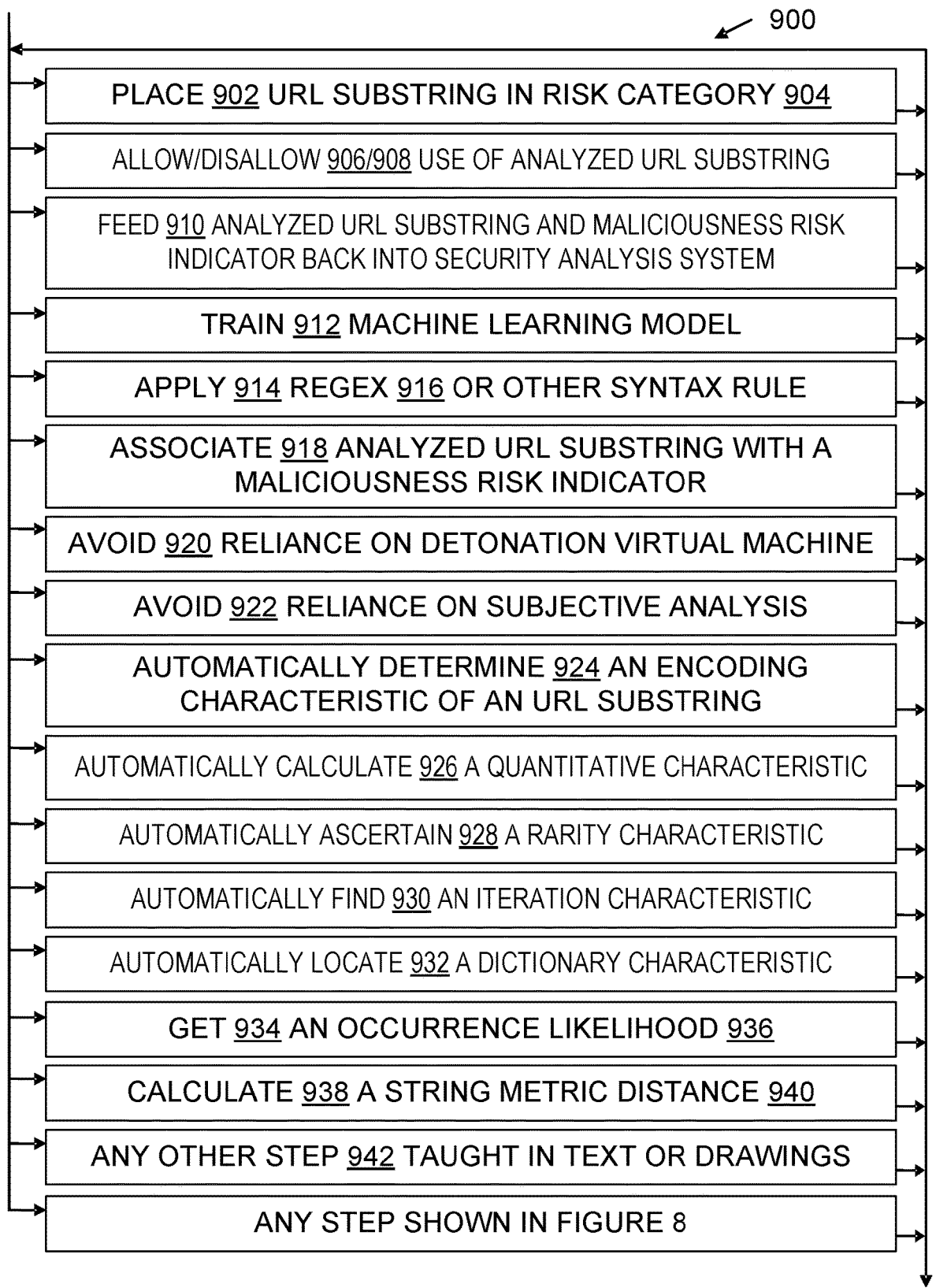
FIG. 9 is a flowchart further illustrating steps in some URL security analysis methods.

508 no-lookup malice pattern, which does not rely on a dictionary lookup 510 lookup malice pattern, which relies on a dictionary lookup or a table lookup 512 domain reputation malice pattern, which relies on a pre-existing score or categorization of a domain's reputation
514 encoding malice pattern, which depends on whether a specified encoding is used in a URL
516 quantitative malice pattern, which depends on a quantitative characteristic of a URL such as a length or count
518 machine learning malice pattern, which relies use of a machine learning model
520 iteration malice pattern, which recognizes an iterative change in an otherwise shared portion of a set of URLs
522 rarity malice pattern, which recognizes a statistical anomaly, or other departure from expectations; a rarity characteristic can apply to a proper substring of the URL, or to the entire URL
524 dictionary malice pattern, which involves a lookup to a dictionary
526 multi-URL malice pattern, which relies on analyzing a set of URLs as opposed to being able to analyze one URL by itself
600 dictionary data structure; a dictionary may be implemented as a list, tree, collection, etc.; although it will often be organized to speed searching, it does not need to be sorted unless expressly described as sorted, and also does not need to be complete in any particular sense, to qualify as a dictionary 600
602 content of dictionary; also refers to kind of content in dictionary
604 sensitive key words, e.g., words which provoke an emotional response
606 words of a natural language (English, Spanish, Chinese, etc.)
608 brand strings; e.g., product names, company names, commercial slogans, words or phrases registered as trademarks
702 punycode
704 punycode domain malice pattern
706 homoglyph
708 homoglyph domain malice pattern
710 base64 encoding
712 base64 encoding malice pattern
714 unexpected language malice pattern
716 too many subdomains malice pattern
718 too many directories malice pattern
720 domain too long malice pattern
722 subdomain too long malice pattern
724 atypical use of branding string malice pattern
726 typo squatting malice pattern
728 query path malice pattern
730 query parameter malice pattern
732 automatically generated domain malice pattern
734 sensitive key words used malice pattern
736 unlikely string malice pattern
800 flowchart; 800 also refers to URL analysis methods illustrated by or consistent with the FIG. 8 flowchart
802 obtain a URL substring, e.g., during an automated scan of web pages or email bodies or scripts or HTTP or HTTPS operations
804 compare URL substring to malice pattern; e.g., computationally and automatically test whether the URL substring complies with the malice pattern, or get a maliciousness risk indicator from software implementing the malice pattern, or both
806 assign a maliciousness risk indicator; may be done during the comparison 804 or may be a separate step
808 analyze an URL substring according to one or more malice patterns
810 enhance cybersecurity of a guarded system
900 flowchart; 900 also refers to URL analysis methods illustrated by or consistent with the FIG. 9 flowchart (which incorporates the steps of FIG. 8)
902 place URL substring in a risk category
904 URL substring risk category, e.g., "safe", "risky", "unsafe", "low risk", or "high risk"
906 allow use of an analyzed URL substring, based an analysis result
908 disallow use of an analyzed URL substring, based an analysis result
910 feed an analyzed URL substring back into a security analysis system, e.g., as machine learning training data
912 train a machine learning model
914 apply a syntax rule to see whether a URL substring has a particular syntax
916 regular expression
918 associate an analyzed URL substring with a maliciousness risk indicator, e.g., as a tuple in a list
920 avoid reliance on detonation analysis
922 avoid reliance on subjective analysis
924 determine an encoding characteristic of a substring
926 calculate a quantitative characteristic of a substring
928 ascertain a rarity characteristic of a substring
930 find an iteration characteristic of a substring
932 locate a dictionary characteristic of a substring
934 get an occurrence likelihood
936 occurrence likelihood generally, e.g., a frequency, a relative frequency, or a probability
938 calculate a distance between strings according to a string metric
940 a distance between strings according to a string metric 346
942 any step discussed in the present disclosure that has not been assigned some other reference numeral Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

A given operating environment 100 may include an Integrated Development Environment (IDE) 122 which provides a developer with a set of coordinated computing technology development tools 122 such as compilers, interpreters, decompilers, assemblers, disassemblers, source code editors, profilers, debuggers, simulators, fuzzers, repository access tools, version control tools, optimizers, collaboration tools, and so on. In particular, some of the suitable operating environments for some software development embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but many teachings herein are applicable with a wide variety of programming languages, programming models, and programs.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

With reference to FIGS. 1 through 7, some embodiments use or provide a functionality-enhanced system 400. The functionality enhancement promotes cybersecurity by automatically analyzing URLs, consistently and efficiently assigning them maliciousness risk indicators, and taking action to enhance the cybersecurity of one or more guarded systems based on the analysis results.

Figure 2:
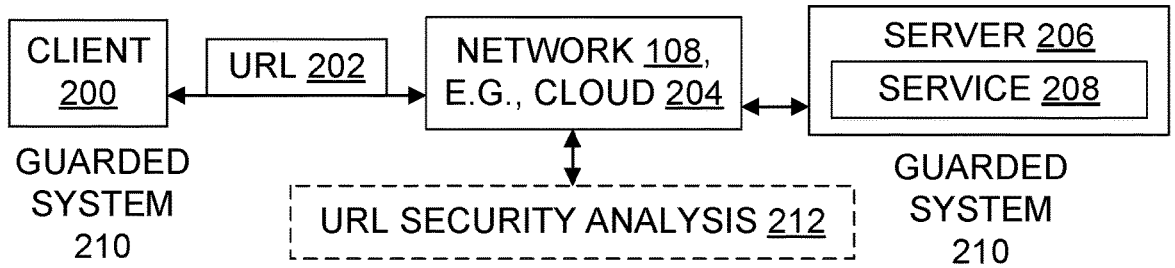
FIG. 2 is a block diagram illustrating an environment which includes a client communicating over a network with a service, in which at least one communication includes an URL.

As shown in the example of FIG. 2, a client 200 communicates through a cloud 204 or other network with a service 208 running on a remote server 206. The communications between service 208 and client 200 include one or more URLs 202, which are subject to security analysis 212, thereby making both the client and the server operate as guarded systems 210. Rather than being viewed as two separate guarded systems 210, the client 200 and the server 206 may also be viewed as parts of a single large guarded system 210. Informally, each system 200, 206 is guarded because each receives analyzed URLs to act upon. For instance, URLs originating in a browser 124 address bar on the client 200 may be sent to the server 206. URLs originating in a web page on the server 206 may be sent to the client 200. In each direction, the URLs in this example are subject to security analysis 212, so both systems 200, 206 are guarded systems 210. Other systems 102 may be configured differently, e.g., a system might analyze only URLs of incoming emails, or analyze only URLs originating in the cloud 204. Also, URL analysis does not necessarily run alongside communications involving URLs; it may also or instead run inline, e.g., URL analysis functionality may be located in between a client 200 connection to a network and a server 206 which performs operations on behalf of the client 200. Also, URL analysis with one or more malice patterns as taught herein may be used alone, or such URL analysis may be used in combination with other analyses. For instance, a system analyzing links in emails could use malice patterns 502 when selecting links for detonation 342.

Figure 3:
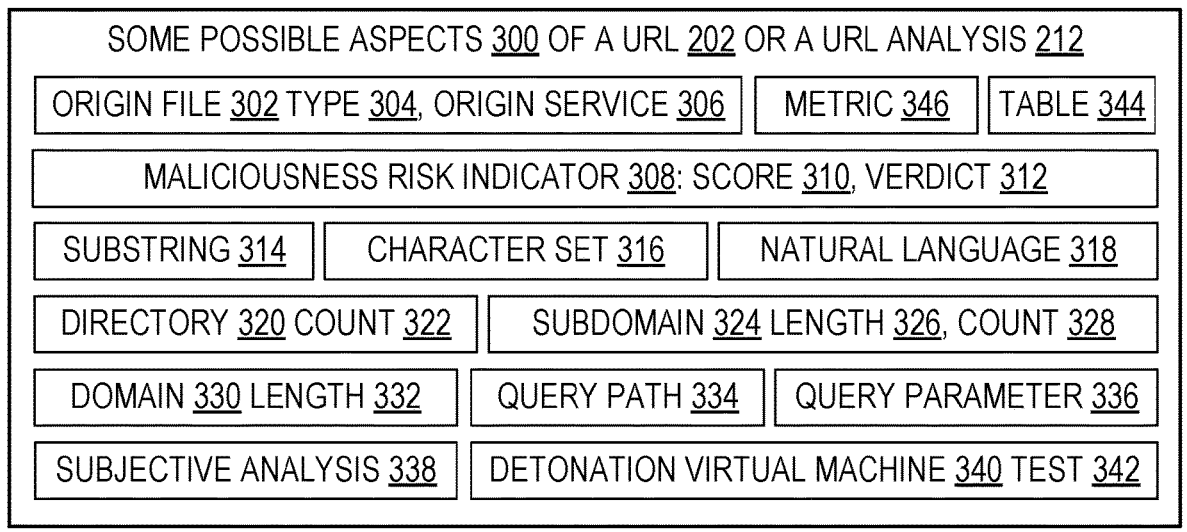
FIG. 3 is a block diagram illustrating some aspects of a URL or of URL analysis.

FIG. 3 shows some aspects 300 of URLs 202 and URL analysis 212. These aspects are discussed as appropriate at various points within this disclosure.

Figure 4:
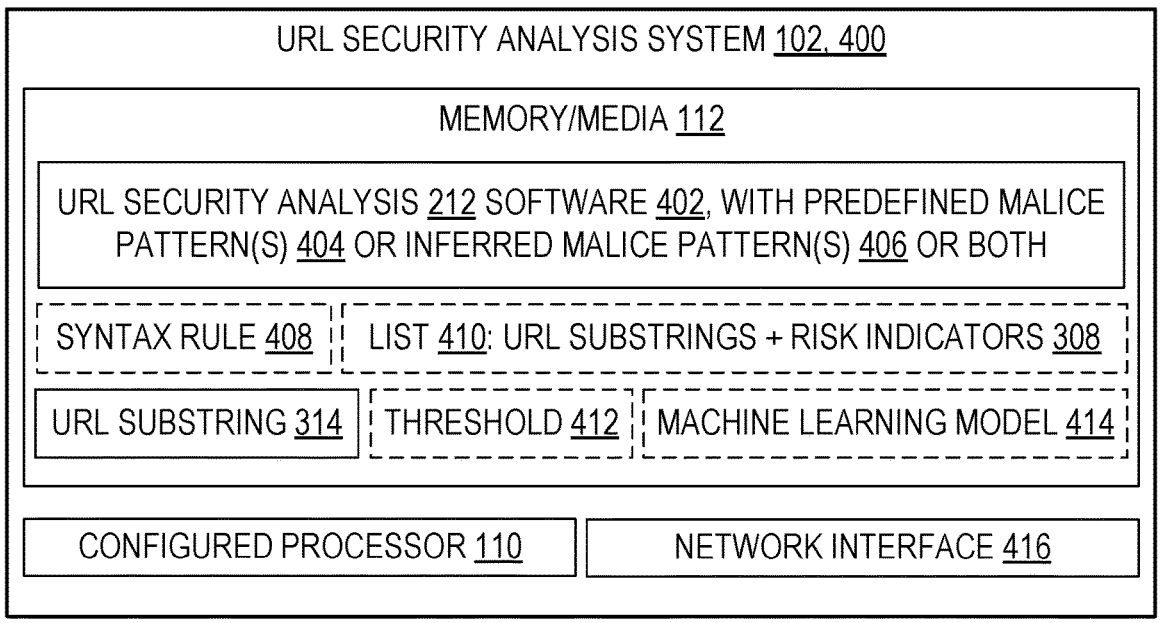
FIG. 4 is a block diagram illustrating aspects of a system which is configured with URL security analysis functionality employing one or more malice patterns.

FIG. 4 further illustrates some embodiments of a URL security analysis system 400 which is an example of a system 102 generally. The illustrated system 400 includes memory 112 configured with URL security analysis software 402 that operates as described herein to analyze URL substrings 314. The URL security analysis software 402 uses one or more malice patterns 502, such as predefined malice patterns 404, inferred malice patterns 406, or both. Predefined malice patterns 404 do not rely on use of machine learning. Reliance, or avoidance of reliance, is generally implementation-specific, since almost any calculation can be accomplished with a suitable machine learning model (however inefficiently). Some examples of predefined malice patterns 404 include implementations of the malice patterns shown in FIG. 7, other than inferred patterns 406, at least when those predefined malice pattern implementations do not rely on machine learning model output. By contrast, inferred malice patterns 406 rely on use of machine learning models or statistical models. The illustrated URL security analysis system 400 includes a processor 110 configured by the URL security analysis software 402. The illustrated URL security analysis system 400 also includes a network interface for receiving URL substrings 314 to be analyzed and for outputting analysis 212 results.

As indicated by dashed lines in FIG. 4, some embodiments include a machine learning model 414. Some include one or more thresholds 412 usable with statistical calculations for URL security analysis 212. Some embodiments use one or more syntax rules 408 in predefined malice patterns 404, e.g., to help recognize and quantify URL aspects such as a count 322 of directories 320 in the URL substring, a length 332 of a domain name 330 in the URL substring, or a count 328 and length(s) 326 of subdomain(s) 324 in the URL substring. Some embodiments produce as output a list 410 of URL substrings and respective risk indicators 308; some use such a list 410 as training data input to a machine learning model 414. Other embodiments consistent with teachings herein may organize URL substring security analysis functionality differently than is shown in these Figures.

In some embodiments, a maliciousness risk indicator 308 may include a maliciousness risk score 310 in a range between 0.0 and 1.0, or another numeric range. The maliciousness risk score indicates roughly how good or how bad the URL is considered. A value from a set of three or more enumeration values may also be used as a maliciousness risk score 310, e.g., a value from the set {"very bad", "possibly bad", "probably safe", "definitely safe"}. Alternately or in addition, a maliciousness risk indicator 308 may include a maliciousness verdict 312 such as a Boolean value or an enumeration value from a set of two enumeration values. The maliciousness verdict 312 indicates whether a URL is deemed "good" or "bad" (or deemed "safe" or "malicious", or deemed "okay" or "suspect", etc.) without indicating the extent of that goodness or badness.

Figure 5:
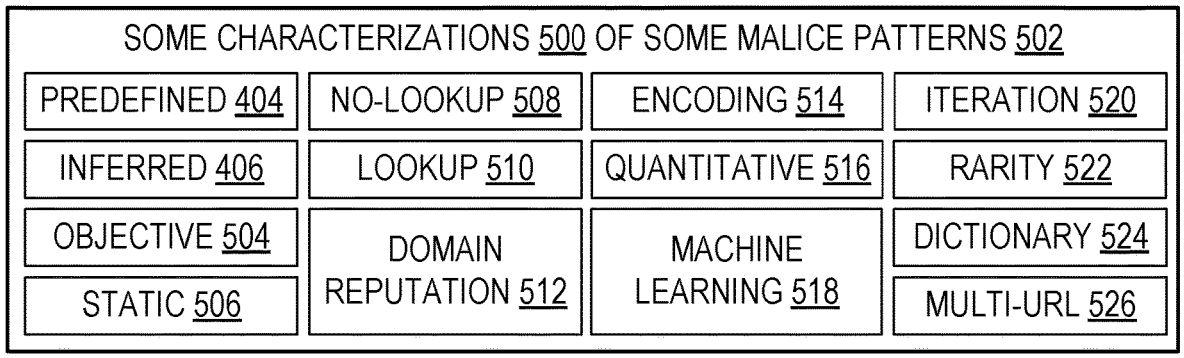
FIG. 5 is a block diagram illustrating some characterizations of some malice patterns.

FIG. 5 shows some characterizations 500 of some malice patterns. Some of the illustrated characterizations are partly or wholly exclusive of one another, e.g., lookup 510 and no-lookup 508 characterizations would not both apply to the same malice pattern 502. Similarly, a malice pattern 502 that uses machine learning would not be predefined 404 and would be inferred 406. However, other illustrated characterizations are not necessarily exclusive of one another.

For example, a long domain malice pattern pattern-1 502, 720 may be implemented to check an URL substring for the presence of a domain 330 whose length 332 exceeds an administrator-defined threshold 412 of twenty characters, in which case the malice pattern would be predefined 404 (since it does not rely on machine learning). This pattern-1 would also be objective 504 (since it does not rely on subjective human review), static 506 (since it does not use a detonation virtual machine), no-lookup 508 (since it does not require a table lookup or a dictionary lookup), and quantitative 516 (since it relies on a length or count or other numeric value, namely, domain length 332). On the other hand, the domain length threshold might be set by operation of a machine learning model 414 instead of being set by an administrator. So a long domain malice pattern pattern-2 502, 720 could be implemented, which would be inferred 406, objective 504, static 506, no-lookup 508, and quantitative 516. Incidentally, the value twenty for the threshold 412 is only an example; a threshold 412 may have a different value even if it is not set by machine learning.

As another example, a domain generation malice pattern 502, 732 may be implemented to check a set of URL substrings for the presence of domain names 330 which have a shared portion and which differ in an iterating portion. In the following two sets of examples, "malfoo" is a shared portion, and the iterating portion is numeric: "malfoo- 00.com", "malfoo-01.com", and "malfoo-02.com", or "268malfoo.com", "389malfoo.com", "763malfoo.com", and "1243malfoo.com". The iterations need not be consecutive. Indeed, iterations need not use numeric digits, e.g., character iteration is used in "malfooaaa.net", "malfooaab.net", and "malfooaac.net". Assuming no use of machine learning to detect iterations, this domain generation malice pattern 732 may be characterized as a predefined 404, objective 504, static 506, no-lookup 508, iteration 520, and multi-URL 526 malice pattern 502.

Malice patterns which have predefined 404 implementations may be particularly beneficial in guarding systems 210 which are partially or fully "air gapped" by reason of being disconnected or only intermittently connected to another networked device or remote cloud. Some air gapped systems may be more suitable or less suitable for protection from inferred patterns 406, depending on circumstances such as where the URL security analysis software 402 resides, how intermittent the connectivity is, what data transfers have priority during the intermittent connections, and the capability of a machine learning model to adapt without connectivity as opposed to the reliance on connectivity for updating signature-based systems.

The foregoing are merely examples. One of skill will also recognize other characterization 500 combinations in various malice patterns, when informed by the teachings provided herein.

Figure 6:
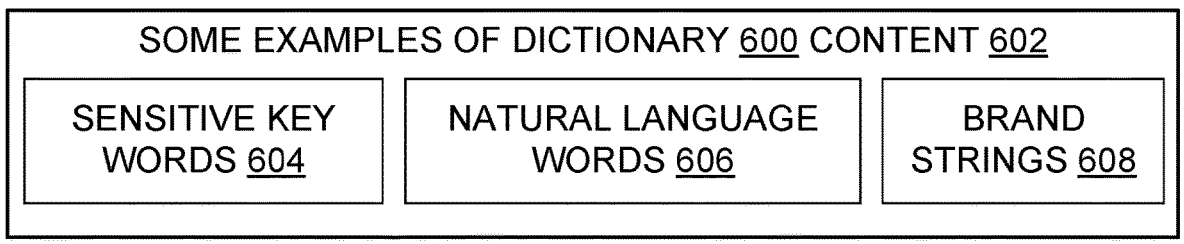
FIG. 6 is a block diagram illustrating some examples of dictionary content.

FIG. 6 shows some examples of content 602 used in dictionaries 600. "Dictionaries" 600 are searchable data structures of meaningful strings, usable by lookup 510 implementations of malice patterns 502. Strings are "meaningful" in this sense when they represent words or phrases that have an everyday use in human discussion, e.g., people in general discuss sensitive key words 604, consumers and advertisers discuss brand names 608, and various people use natural language words 606 in everyday discussions. "Tables" 344 include both dictionaries 600 and searchable data structures of strings that are not necessarily meaningful outside the context of URL substring analysis, e.g., gibberish strings. All malice patterns whose implementation uses a dictionary lookup are dictionary 524 malice patterns. However, not all lookup 510 malice patterns are dictionary 524 malice patterns, because a malice pattern may be implemented to do lookups only on non-meaningful content such as gibberish.

Figure 7:
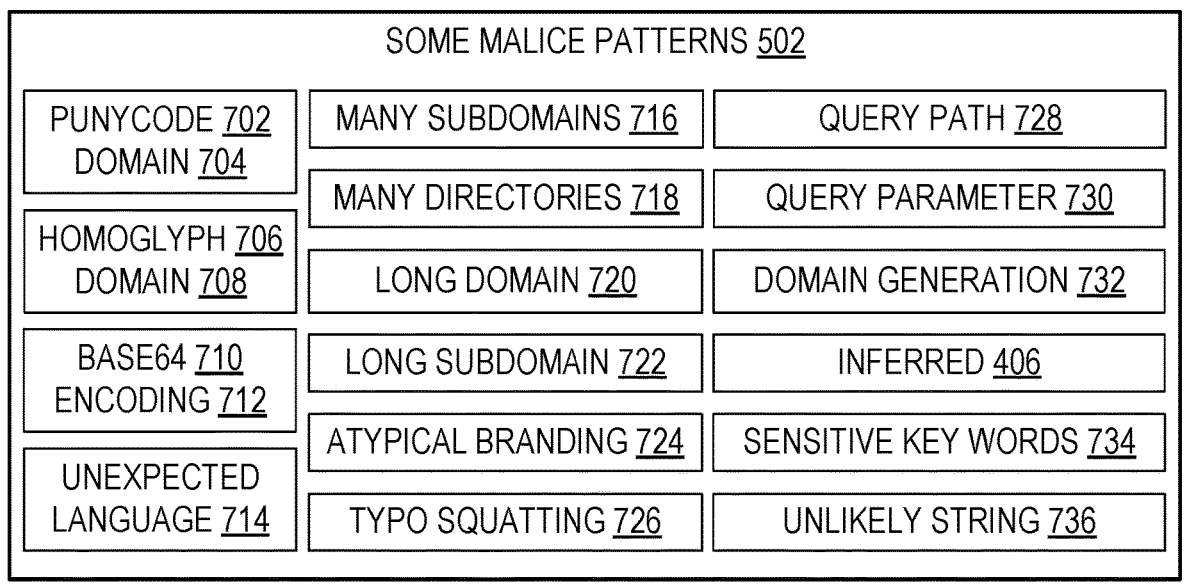
FIG. 7 is a block diagram illustrating some malice patterns.

FIG. 7 shows some malice patterns 502. Some suitable pattern 502 implementations are discussed below.

A punycode domain malice pattern 704 checks for the presence of punycode (also referred to as "puny code") 702 in a domain name 330 or other URL substring. An implementation 704 may detect use of puny code by detecting an "xn- -" (x n dash dash) prefix. By convention, puny code URLs start with "xn- -", e.g., "xn- -malwar-gva.com" is a punycode domain. Punycode is an encoding syntax by which a Unicode (UTF-8) string of characters can be translated into basic ASCII characters that are permitted in network host names 330. In "malwaré.com", the é is a UTF-8 character; "malwaré.com" converted to puny code yields "xn- -malwar-gva.com".

A homoglyph domain malice pattern 708 checks for the presence of a homoglyph 706 in a domain name 330 or other URL substring. A homoglyph is a character identical or nearly identical in appearance to another character. Homoglyphs can be used in an URL, e.g., in the domain 330 or in the query parameters 336. An implementation 708 may detect use of a homoglyph 706 by using a lookup table that maps an English (for example) character to all the possible homoglyph (UTF-8 character) representations of that original English character. One of skill will recognize this may differ from punycode because punycode doesn't use UTF-8 character encoding, but homoglyphs may also be combined with punycode.

As an example, "Microsoft.com" can be written using homoglyphs so that it appears like this: "MiCRoSOfT.com", which corresponds to punycode xn- -ft-5ib09jesqa24t121cc9f. In view of possible ambiguity introduced by Patent Office practice compliance processing such as font embedding, font identification removal, or optical character recognition, it may be helpful to note that most of the text of this present disclosure as originally submitted to the United States Patent and Trademark Office is in an Arial® font, but the "MiCRoSOfT.com" text is in a combination of Arial®, Segoe® UI Symbol, Gadugi®, and Sylfaen™ fonts. Arial® and Segoe® are marks of The Monotype Corporation, and Gadugi® and Sylfaen™ are marks of Microsoft Corporation.

A base64 encoding malice pattern 712 checks for the presence of base64 encoding 710 in a domain name 330 or other URL substring. An implementation 712 may detect use of base64 encoding 710 by checking for URL substring compliance with base64 encoding conventions or requirements. For instance, base64 character strings are always of a fixed length which is an integer multiple of 4 octets (i.e., the number of bytes is evenly divisible by 4). To meet this fixed length, they will often be padded at the end with "=" or "==". One may detect use of base64 by identifying strings of such a length, especially if they have indicators like "=" or "==". Base64 encodings are generally found in the query parameters 336. An embodiment may use a familiar base64 decoder to decode an encoded string. For example, "hxxps://domain-1/maliciouspath-X?foo=bar" would appear in base64 encoded form as "hxxps://domain-1/maliciouspath-X?Zm9vPWJhcg=".

An unexpected language malice pattern 714 checks for the presence of an unexpected natural language in a domain name 330 or other URL substring. For example, when English is the expected natural language, substrings in other languages may be flagged. The expected language may also be defined as a group of languages, e.g., in Canada or a context which uses Canadian URLs, the expected language may be defined as English or French. The expected language may also be defined in terms of which languages are not expected, e.g., any language X, Y, or Z is unexpected. An implementation 714 may detect use of an unexpected natural language by scanning the URL substring to see whether it contains any characters outside the set of printable English (or other expected language) characters.

A many subdomains malice pattern 716 checks for the presence of an unusually large or otherwise suspect number of subdomains in an URL substring, e.g., URLs in which there are a large number of sub-domains appearing in the FQDN. An implementation 716 may parse the URL substring to find subdomains 324, and check whether there are more than N of them, where N 412 is user-defined or a default value or a hard-coded value, for example. Threshold N could also be determined statistically or by machine learning. For an URL of the form hxxps://[sub-domain-name].malicious-website.net/an example would be hxxps://apple.com.iphone.appleID.malicious-website.net/. (iPhone® and Apple® are marks of Apple, Inc., used here merely as part of an example of a target in malicious activity).

A many directories malice pattern 718 checks for the presence of an unusually large or otherwise suspect number of directories 320 in an URL substring, e.g., in a query path

334. Attackers sometimes add directories to make an URL long so the actual domain will be overlooked. An implementation 718 may parse the URL substring to find directories 320, and check whether there are more than N of them, where N 412 is user-defined or a default value or a hard-coded value, for example. Threshold N could also be determined statistically or by machine learning. An example would be hxxps://account-verify.malicous-website.net/find/my/iphone/location/on/map.

A long domain malice pattern 720 checks for the presence of an unusually long domain 330 in an URL substring. Similarly, a long subdomain malice pattern 722 checks for the presence of an unusually long subdomain 324 in an URL substring. An implementation 720 or 722 may parse the URL substring to find the domain 330 or a subdomain 324 and calculate its length 332 or 326, and check whether it is longer than N characters, where N 412 is user-defined or a default value or a hard-coded value, for example. Threshold N could also be determined statistically or by machine learning. An example could be hxxps://find-my-iphone-location-on-map.malicous-website.net/. (iPhone® is a mark of Apple, Inc., used here merely as part of an example of a target in malicious activity).

An atypical branding malice pattern 724 checks for the presence of an atypical or otherwise suspect use of a brand string 608 in an URL substring, e.g., in a path 334. An implementation 724 may try to find in the URL substring any brand string 608 from a sorted list or trademark office publication or other dictionary 600 of brand strings, using stomp( ) or a similar string comparison routine. Two examples are hxxps://account-verify.malicous-website.net/OneDrive/login.php, and hxxps://account-verify.malicous-website.net/Apple/login.php. (OneDrive® is a mark of Microsoft Corporation, Apple® is a mark of Apple, Inc., and each is used here merely as part of an example of a target in malicious activity).

A typo squatting malice pattern 726 checks for the presence of an atypical or otherwise suspect use of string that is close in spelling to a brand string 608 or a key word 604 in an URL substring. An implementation 726 may do a lookup to confirm the presence in the dictionary of a word without the typo in it. Detection of typo squatting can also be done with regular expressions 916 and string distance algorithms 346, by feeding URL substrings to familiar spelling correction tools which have been trained using the dictionary 600, for example. Attackers use typo squatting by taking actual product or company names, for instance, and misspelling them slightly; users tend to overlook the misspellings and are directed to a malicious location as a result.

A query path malice pattern 728 parses multiple URLs and performs string comparisons to see if some or all of the URLs have the same path 334 structure off their respective different domains. Using such URLs, an attacker tries to compromise multiple domains, hanging the same path structure off the each target domain. For example, the URLs might look like this (the path structure is in bold here for clarity—one of skill recognizes that most browsers and other URL-using tools ignore bold and similar formatting or do not support it):
hxxps://domain-1/maliciouspath-X
hxxps://domain-2/maliciouspath-X
hxxps://domain-n/maliciouspath-X,
where domain-1 and domain-j in the set domain-1 through domain-n do not necessarily have any text in common (unlike a sequence of automatically generated iteration domains). That is, the domains might look like this:
hxxps://foobar.com/maliciouspath-XI
hxxps://widgetymax.net/maliciouspath-X
hxxps://speciouslight.biz/maliciouspath-X A query parameter malice pattern 730 parses multiple URLs and performs string comparisons to see if some or all of the URLs have the same query parameter 336 off their respective different domains. Such URLs occur where an attacker uses multiple domains but includes the same query parameter in each URL. For example, the URLs might look like this (the query parameter is in bold here for clarity):
hxxps://domain-1/maliciouspath-X?foo=bar
hxxps://domain-2/maliciouspath-X?foo=bar
hxxps://domain-n/maliciouspath-X?foo=bar
As with the query path malice pattern 728, the use of domain-1 through domain-n in this context does not imply generated domains, but rather merely indicates that there are different domains. Thus, domain-1 through domain-n do not necessarily have any text in common. Or the URLs might look like this, with different paths but a repeated parameter such as "foo=bar":
hxxps://domain-1/maliciouspath-X?foo=bar
hxxps://domain-1/maliciouspath-Y?foo=bar
As yet another example, the domain and the path may be the same in multiple URLs which have varied query parameters, e.g., a query parameter may be used to customize a phishing attack to a particular intended victim. Such URLs might look like this:
hxxps://domain/maliciouspath?foo-1
hxxps://domain/maliciouspath?foo-2
hxxps://domain/maliciouspath?foo-N A domain generation malice pattern 732 parses multiple URLs and performs string comparisons to see if some or all of the URLs have a shared portion and an iterating portion in their respective domains 330. In some embodiments, the presence of a shared proper (i.e., less than all) substring in the domains is sufficient, and whatever non-empty portion is not common to the URL domains is considered the iterating portion. Some domain generation examples are given in the discussion of FIG. 5.

A sensitive key words malice pattern 734 checks for the presence of any key words 604 in an URL substring. An attacker may include sensitive key words in an URL, especially in the domain name, in an effort to alarm the user and urge hasty action by the user. An implementation 724 may try to find in the URL substring any key word 604 from a sorted list or other dictionary 600 of key words, using strcmp( ) or a similar string comparison routine. Some examples are:
hxxps://123security-blockedsss.azurewebsites.net
hxxps://123-account-verify-sss.azurewebsites.net
hxxps://mvm-voicemail-sss.azurewebsites.net
hxxps://invoice-sss.azurewebsites.net
The key words 604 in these examples are "security", "blocked", "account", "verify", "voicemail", and "invoice", as indicated above in bold for clarity. These particular examples also include the brand string "azure", which may implicate atypical branding malice pattern 724. (Azure® is a mark of Microsoft Corporation, used here merely as part of an example of a target in malicious activity).

In some embodiments, the sensitive key words malice pattern 734 tries to find in the URL any word from a list 600 of monitored words, using stomp( ) or similar routine, and also tries to find in the URL any word that is within a specified distance 940 of any word in the list of monitored words. For example "Office365" and "Office356" are within one transposition of each other (they are very close) but "Office365" and "MicrosoftOffice365" are nine insertions apart (not close).

An unlikely string malice pattern 736 checks for the presence of unlikely substrings within an URL substring. An implementation 736 may detect unlikely substrings using gibberish detection that computes the entropy of the string, using statistical models that determine the likelihood of adjacent characters, using stochastic models that determine the likelihood of adjacent characters, or a combination of such mechanisms. Likelihood can be relative to a particular language or languages, e.g., English, or English and French, based on a particular dictionary, and may measure using, e.g., a Markov chain model. An implementation 736 may do a lookup to confirm that a string is unlikely, e.g., by confirming that a string or one of its substrings is not found in a dictionary of known words, or by confirming that a string or one of its substrings is found in a dictionary of nonsense words.

Some embodiments use or provide a uniform resource locator (URL) security analysis system which includes a memory 112, and a processor 110 that is in operable communication with the memory. The processor 110 is configured to perform URL security analysis steps which may include (a) obtaining 802 a URL substring 314, (b) automatically comparing 804 the URL substring to at least one malice pattern 502, (c) assigning 806 a maliciousness risk indicator 308 to the URL substring based on a result of the comparing, thereby making the URL substring an analyzed 808 URL substring, and (d) enhancing 810 security of a guarded system 210 based on at least the maliciousness risk indicator by performing at least one of the following: disallowing 908 use of the analyzed URL substring by the guarded system when the maliciousness risk indicator places 902 the analyzed URL substring in a high risk category 904, allowing 906 use of the analyzed URL substring by the guarded system when the maliciousness risk indicator places the analyzed URL substring in a low risk category, or feeding 910 the analyzed URL substring and the maliciousness risk indicator back into the security analysis system as at least a partial basis for security analysis of at least one other URL substring.

In some embodiments, the URL security analysis system 400 includes a trained machine learning model 414. Some examples of trained machine learning models 414 include models using Convolutional Neural Networks (CNN), Decision Tree Classifiers, Long Short Term Memory (LSTM), Logistical Regression, or Deep Neural Networks.

In some embodiments, the URL security analysis system 400 includes a syntax rule 408 defining a URL substring. An example of a syntax rule defining a URL substring is a Regular Expression (REGEX). Syntax rules may be used to perform or assist parsing, e.g., to parse out the domain, subdomain, query path, and query parameter substrings of an URL.

In some embodiments, the URL security analysis system 400 includes a list 410 of URL substrings with one or more associated maliciousness risk indicator values. An example of a list 410 of URL substrings with one or more associated maliciousness risk indicator values is a URL reputation list or a domain reputation list generated from the findings of one of the models 414. A domain reputation malice pattern 732 uses a trained machine learning model to assign maliciousness risk indicator values based on domain reputation, which may be based in turn on feedback from Internet Service Providers, cybersecurity providers, or the recorded experiences of the URL security analysis 212 provider, for example.

In some embodiments, the URL security analysis system 400 is further characterized in that the URL security analysis system 400 avoids 920 reliance on any detonation virtual machine as a basis for allowing or disallowing use of the analyzed URL substring by the guarded system. In some, the URL security analysis system 400 avoids 922 reliance on any subjective analysis by a human as a basis for allowing or disallowing use of the analyzed URL substring by the guarded system. In some, both avoidances 920, 922 are characteristic of the system 400.

In some embodiments, the URL security analysis system 400 includes and utilizes at least one predefined malice pattern 404. Predefined malice patterns 404 can be grouped, e.g., according to how many URLs they check at a time, or whether they use lookup, or both.

Some predefined malice patterns 404 can be implemented to analyze 808 a single URL at a time, and to do so without any substantial lookup. For example, the system 400 may include at least one of the following predefined malice patterns 404: a punycode domain malice pattern 704, a base64 encoding malice pattern 712, a many subdomains malice pattern 716, a many directories malice pattern 718, a long subdomain malice pattern 722, a long domain malice pattern 720, or an unexpected language malice pattern 714.

Some predefined malice patterns 404 can be implemented to analyze 808 a single URL at a time using some kind of lookup. For example, the system 400 may include at least one of the following predefined malice patterns 404: a homoglyph domain malice pattern 708 (using a lookup table that maps an English character to its homoglyph UTF-8 character representations), a sensitive key words malice pattern 734 (lookup in a list of key words), an atypical branding malice pattern 724 (lookup in a list of brand words), a typo squatting malice pattern 726 (lookup in a list of monitored words), or an unlikely string malice pattern 736 (lookup to a dictionary of nonsense words or one of sensible words).

Some predefined malice patterns 404 can be implemented to analyze 808 multiple URLs at a time. For example, the system 400 may include at least one of the following predefined malice patterns 404: a query path malice pattern 728 (check multiple URLs to see if they have the same path structure off their respective different domains), a query parameter malice pattern 730 (check multiple URLs to see if they have the same query parameter off their respective different domains), or a domain generation malice pattern 732 (check multiple URLs to see if they have a common substring in their domains).

In some embodiments, the URL security analysis system 400 includes and utilizes at least one inferred malice pattern 406. For example, some systems 400 include a machine learning model-based domain reputation malice pattern 512, 518. In some embodiments, domain reputation (and implicitly also, subdomain reputation) may be viewed as similar to a credit score for the domain or subdomain. Lookups against a domain reputation may start with the full URL and progressively work the way down to the final Top Level Domain (TLD), substituting an asterisk "*" for cases where at least one rollup occurred. An embodiment may perform lookups all the way down to *.com and further to * which means even the final TLD was unknown. For any cases where a rollup was performed, the maliciousness score 310 may reflect performance of the rollup. So the result for *.bar.com may be a different score than the score for raw bar.com as a domain. This technique allows an embodiment to produce a score for any possible domain, even when starting with a static list of only domains that have been previously seen. Some embodiments using domain reputation do not rely on a preexisting score, because they can compute a score as URLs are processed, and apply that score.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. Embodiments are not limited to the specific examples, URL terminology, component names, optimizations, algorithmic choices, metrics, thresholds, data, data types, configurations, implementations, arrangements, displays, features, approaches, or scenarios provided herein. A given embodiment may include additional or different technical features, mechanisms, sequences, data structures, or functionalities for instance, and may otherwise depart from the examples provided herein.

Processes (a.k.a. Methods)

FIG. 8 illustrates a method 800 which is an example of methods that may be performed or assisted by an enhanced system with URL substring security analysis functionality, such as system 400. The enhanced system obtains 802 a URL substring, automatically compares 804 the URL substring to at least one malice pattern, assigns 806 a maliciousness risk indicator to the URL substring based on a result of the comparing (thereby making the URL substring an analyzed 808 URL substring), and enhances 810 security of a guarded system based on at least the maliciousness risk indicator. Enhancement 810 may include allowing 906 URL substring use, at least partially disallowing 908 URL substring use, feeding 910 the results back in to tune or train 912 the system 400, or alerting an administrator, for example.

FIG. 9 further illustrates URL substring security analysis methods (which may also be referred to as "processes" in the legal sense of that word) that are suitable for use during operation of a system 400 or other system 102 which performs URL substring security analysis 212. FIG. 9 includes some refinements, supplements, or contextual actions for steps shown in FIG. 8. FIG. 9 also incorporates steps shown in FIG. 8. Technical processes shown in the Figures or otherwise disclosed will be performed automatically, e.g., by a SIEM, unless otherwise indicated. Processes may also be performed in part automatically and in part manually to the extent action by a human administrator or other human person is implicated, e.g., in some embodiments a human administrator may specify thresholds 412. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 8 and 9. Steps may be performed serially, in a partially overlapping manner, or fully in parallel. In particular, the order in which flowchart 800 action items or flowchart 900 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a uniform resource locator (URL) security analysis method including obtaining 802 a URL substring, automatically comparing 804 the URL substring to at least one malice pattern 502, and automatically assigning 806 a maliciousness risk indicator to the URL substring based on a result of the comparing, thereby making the URL substring an analyzed 808 URL substring.

In this example, the comparing includes at least one of the following: automatically determining 924 an encoding characteristic 514 of the URL substring (e.g., per a punycode pattern 704, a homoglyph pattern 708, or a base64 pattern 712), automatically calculating 926 a quantitative characteristic 516 of the URL substring (e.g., per a many subdomains pattern 716, a many directories pattern 718, a long subdomain pattern 722, or a long domain pattern 720), automatically ascertaining 928 a rarity characteristic 522 of the URL substring (e.g., per an unlikely string pattern 736, an atypical branding pattern 724, an unexpected language pattern 714, or inferred 406 as anomalous using machine learning), automatically finding 930 an iteration characteristic 520 of the URL substring as a member of a set of URL substrings (e.g., per a domain generation pattern 732, a query parameter pattern 730, or a query path pattern 728), or automatically locating 932 a dictionary characteristic 524 of the URL substring (e.g., per a typo squatting pattern 726, an unlikely string pattern 736, a sensitive key words pattern 734, or an atypical branding pattern 724).

In this example, the method also includes enhancing 810 security of a guarded system based on at least the maliciousness risk indicator. Enhancing 810 in this example may be accomplished by performing at least one of the following: disallowing 908 use of the analyzed URL substring by the guarded system when the maliciousness risk indicator places the analyzed URL substring in a high risk category, or allowing 906 use of the analyzed URL substring by the guarded system when the maliciousness risk indicator places the analyzed URL substring in a low risk category.

In some embodiments, the comparing 804 includes automatically ascertaining 928 a rarity characteristic of the URL substring, and the ascertaining is based at least in part on at least one of the following as a context of the URL substring: a particular URL substring origin file type 304, or a particular URL substring origin service 306. Such context may help an embodiment more accurately detect inferred malice patterns 406. For example, an URL originating from a word processing context such as a PDF document, an email body, or a .DOCX document, may be more suspect. Conversely, an URL originating from a secured service such as Office 365® mail flow, Azure® Web Apps, Azure® Storage, or Azure® content delivery network, may be less suspect (marks of Microsoft Corporation).

In some embodiments, the comparing 804 includes automatically determining 924 at least one of the following encoding characteristics 514 of the URL substring: a use of punycode encoding 702 in the URL substring, a use of a homoglyph 706 in the URL substring, or a use of base64 encoding 710 in the URL substring.

In some embodiments, the comparing 804 includes automatically calculating 926 at least one of the following quantitative characteristics 516 of the URL substring: a count 328 of subdomains 324 in the URL substring which is above a specified subdomain count threshold 412; a count 322 of directories 320 in the URL substring which is above a specified directories count threshold 412; a length 326 of a subdomain 324 in the URL substring which is above a specified subdomain length threshold 412; or a length 332 of a domain 330 in the URL substring which is above a specified domain length threshold 412.

In some embodiments, the comparing 804 includes automatically ascertaining 928 at least one of the following rarity characteristics 522 of the URL substring: a string in the URL substring which has an occurrence likelihood 936 below a specified string occurrence likelihood threshold 412 (e.g., gibberish strings); a pairing of a brand string 608 and another string in the URL substring which has an occurrence likelihood 936 below a specified brand pairing occurrence likelihood threshold 412; an unexpected natural language string in the URL substring which has an occurrence likelihood 936 below a specified primary language string occurrence likelihood threshold 412 (e.g., an English dictionary search result 'Not Found' indicates a string is probably not English); an unexpected natural language string in the URL substring which has an occurrence likelihood 936 above a specified non-primary language string occurrence likelihood threshold 412 (e.g., a Russian dictionary search result 'Found' indicates a string is probably Russian); or a string in the URL substring has an anomalousness score assigned by a machine learning model 414, and the anomalousness score is above a specified rare string threshold 412.

In some embodiments, the comparing 804 includes automatically finding 930 at least one of the following iteration characteristics 520 of the URL substring as a member of a set of URL substrings: URL substrings in the set include a shared string and an iterating value; URL substrings in the set include a shared path structure with different domains; or URL substrings in the set include a shared path query parameter with different domains.

In some embodiments, the comparing 804 includes automatically locating 932 at least one of the following dictionary characteristics 524 of the URL substring: a string in the URL substring which is within a specified string metric distance 940 of an entry in a dictionary of natural language words; a string in the URL substring which is within a specified string metric distance 940 of an entry in a dictionary of sensitive key words 604; a string in the URL substring which is within a specified string metric distance 940 of an entry in a dictionary of brand strings 608; a string in the URL substring which has an occurrence likelihood 936 below a specified string occurrence likelihood threshold 412, based on at least one dictionary; or a pairing of a brand string 608 and another string in the URL substring which has an occurrence likelihood 936 below a specified brand pairing occurrence likelihood threshold 412, based on at least a dictionary 600 of brand strings.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as URL security analysis software 402, malice patterns 502, dictionaries 600, and maliciousness risk indicators 308, in the form of data 118 and instructions 116, read from a removable storage medium 114 and/or another source such as a network connection, to form a configured storage medium. The configured storage medium 112 is capable of causing a computer system 102 to perform technical process steps for URL substring security analysis, as disclosed herein. The Figures thus help illustrate configured storage media embodiments and process (a.k.a. method) embodiments, as well as system and process embodiments. In particular, any of the process steps illustrated in FIGS. 8 and 9, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause one or more devices to perform a uniform resource locator (URL) security analysis method. This method includes: obtaining 802 a URL substring; automatically comparing 804 the URL substring to at least one malice pattern; assigning 806 a maliciousness risk indicator to the URL substring based on a result of the comparing, thereby making the URL substring an analyzed URL substring; and enhancing 810 security by disallowing use of the analyzed URL substring when the maliciousness risk indicator places the analyzed URL substring in a high risk category. This method is further characterized in at least one of the following ways: the URL security analysis method avoids 920 reliance on any detonation virtual machine as a basis for disallowing use of the analyzed URL substring; or the URL security analysis method avoids 922 reliance on any subjective analysis by a human as a basis for disallowing use of the analyzed URL substring.

Some embodiments use or provide a machine learning feedback loop to tune detection of malice patterns. In some, the method further includes feeding 910 the analyzed URL substring and a label based on at least the maliciousness risk indicator into a machine learning model 414, thereby tuning the model for use in a subsequent analysis of at least one other URL substring.

Some embodiments test for malicious URLs using multiple patterns 502. In some, the method includes comparing 804 the URL substring to at least three of the following malice patterns: a punycode domain malice pattern 704, a homoglyph domain malice pattern 708, a base64 encoding malice pattern 712, a many subdomains malice pattern 716, a many directories malice pattern 718, a long domain malice pattern 720, a long subdomain malice pattern 722, an unexpected language malice pattern 714, a sensitive key words malice pattern 734, an atypical branding malice pattern 724, a typo squatting malice pattern 726, an unlikely string malice pattern 736, a query path malice pattern 728, a query parameter malice pattern 730, a domain generation malice pattern 732, or an inferred malice pattern 406. In some embodiments, the method includes comparing 804 the URL substring to at least six of these listed malice patterns. In some embodiments, the method includes comparing 804 the URL substring to at least ten of these listed malice patterns.

Additional Examples and Observations

One of skill will recognize that not every part of this disclosure, or any particular details therein, are necessarily required to satisfy legal criteria such as enablement, written description, or best mode. Also, embodiments are not limited to the particular networks, protocols, tools, identifiers, fields, data structures, functions, secrets or other proofs, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered. Cybersecurity functionality enhancements taught herein help avoid malicious Uniform Resource Locators (URLs). Embodiments may reduce or eliminate reliance on subjective analysis or detonation virtual machines. URL substrings 314 are automatically analyzed for maliciousness using malice patterns 52. Patterns 502 may test counts 322, 328, lengths 326, 332, rarity 522, encodings 514, and other inherent aspects of URLs 202. URLs may be analyzed 808 individually, or in groups 526 to detect shared portions, or both. URL analysis 212, 808 may use or avoid machine learning 518, and may use or avoid lookups 510. Malice patterns 502 may be used individually or in combinations to detect malicious URLs. Analysis results may enhance 810 security through blocking 908 use of suspect URLs, flagging 942 them for further analysis, or allowing 906 their validated 808 use, for instance. Analysis results may also be fed 910 back to further train a machine learning model 414 or a statistical 516 model.

Some embodiments provide or use a method for URL static analysis to identify malicious URLs. In some, an indication that the method is in use would be URL checks that take a few seconds or less. Without the benefit of teachings provided herein, a full URL analysis can take 45 seconds to upwards of a couple minutes in some systems 102.

Some embodiments avoid 922 reliance on subject analysis. Human analysis of URLs is expensive, and is also subject to error (e.g., how alert would a person be after inspecting the first hundred or so URLs?) and is also subject to inconsistency (e.g., different people recognize different brand names). Some embodiments also avoid 920 reliance on detonation analysis. Creating a sandboxed virtual machine and "detonating" (linking through) a URL inside that VM takes significant CPU cycles and storage, and probably some network bandwidth. By contrast, analysis as taught herein can provide results faster and perform more consistently than human inspectors.

Some embodiments address security challenges posed by frequent attacker behaviors. Attackers often use the sub-domain-name portion of a URL to construct malicious URLs, which typically host phishing attacks and at times host linked malware. The sub-domain for these malicious URLs will often reflect recognizable patterns such as pseudo random character strings with duplicated characters, extremely unlikely or improbable character strings, atypical uses of known brand names, or textual patterns resulting from automated URL generators. A machine learning model 414 can be trained to analyze a URL, identify these anomalies, and subsequently determine if the URL is malicious. This analysis can help cloud offering security products stop service provider employees and customers from being compromised by phishing web sites and link based malware.

One of skill will acknowledge that a basic structure of a URL can be described as follows: protocol://hostname/path?query#fragment, where the hostname has the format: sub-domain-name.domain-name.domain-extension (this hostname format is also referred to as the FQDN). For example, URLs for some Azure® domains may be described as following the format: hxxps://sub-domain-name.[azuredomain].net/, wherein some example URLs have domains azurewebsites.net, blob.core.windows.net, and web.core.windows.net.

Here are some examples of suspect URLs containing pseudo random characters (shown in bold here for clarity), and hence suitable for detection by malice patterns 502 having a rarity characteristic 522:
hxxps://adcsfscsccscssscccsbssvvsvsccocncovb.azurewebsites.net
hxxps://wrsscbllcmmsnsoosnssvavvcscs.azurewebsites.net
hxxps://5okuygg5ogyjcs.z19.web.core.windows.net
hxxps://dclmsalcmvaklsemwve3.blob.core.windows.net Here are some examples of suspect URLs containing Microsoft brand names or similar strings (shown in bold here for clarity), and hence suitable for detection by an atypical branding malice pattern 724 or a typo squatting malice pattern 726:
hxxps://o365hdyshdquaranterror.z13.web.core.windows.net
hxxps://office365userverify.z13.web.core.windows.net
hxxps://office365user333284.z11.web.core.windows.net
hxxps://sharepointeso365notices1.z13.web.core.windows.net
hxxps://sharepointeso365notices3.z13.web.core.windows.net Here are some examples of suspect URLs containing other brand names (marks of their respective owners) or similar strings (shown in bold here for clarity) with some random characters. These are suitable for detection by an atypical branding malice pattern 724, a typo squatting malice pattern 726, or an unlikely string malice pattern 736:
hxxps://usps3783.blob.core.windows.net
hxxps://capitalfinance.z13.web.core.windows.net
hxxps://adropbox12today6134.blob.core.windows.net
hxxps://soso10.azurewebsites.net Here are some examples of suspect URLs containing automation artifacts, suitable for detection by a domain generation malice pattern 732:
hxxps://ramdaan-2.web.core.windows.net
hxxps://ramdan-3.web.core.windows.net
hxxps://onsia-1.web.core.windows.net
hxxps://onsia-6.web.core.windows.net
hxxps://onsia-3.web.core.windows.net Here are some additional examples of suspect URIs, annotated with bold and applicable characterizations or malice pattern names. These examples are provided with the understanding that many other examples are possible, and that other characterizations or malice patterns may also apply to these example URIs. Also, any brand strings in these URIs are marks of their respective owners, which are used here merely as examples of targets of malicious activity:
hxxps://office365user333284.zll.web.core.windows.net/index.htm?=en-US&username=jane.doe@contoso.com (branding 724)
hxxps://office365userverify.z13.web.core.windows.net/index.html?=en-US&username=jane.doe@contoso.com (branding 724, sensitive 734)
hxxps://xmajvxgaxrjwtrxernas.z19.web.core.windows.net/index.htm?=en-US&username=john.doe@contoso.com (unlikely 736, long subdomain 722 for cutoff of twenty)
hxxps://office365hosting.z19.web.core.windows.net/ (branding 724)
hxxps://soso8.azurewebsites.net/f4e85wftrangoni@contosocomckowkoftrangoni@contoso.comfow[[Name]]f4e185fwc[[Domain]]kowkofcwe#ftrangoni@contoso.com (unlikely 736)
hxxps://validate1mjvsl3pt8mgy01.z19.web.core.windows.net/index.htm?c=nnn014an2n013an07an07an0n08an2n2nD14an0.n013anln09an0n01Dan02anln013annnn08 anln09an09an2n010an07an0n2n01DanlnOlOa.nD1an3n
09a (sensitive 734, long subdomain 722 for cutoff of twenty, unlikely 736)

hxxps://onedriveonee.z13.web.core.windows.net/(branding 724)

hxxps://feteaxewegtavafw.z19.web.core.windows.net/index.htm?=en-US&username=jane.doe@contoso.com (unlikely 736)

hxxps://grsscbllcmmsnsoosnssvawcscs.azurewebsites.net/ (long subdomain 722 for cutoff of twenty, unlikely 736)

hxxps://umdgbsnnababbaagbsbsgbgsgsb.azurewebsites.net/ (long subdomain 722 for cutoff of twenty, unlikely 736)

hxxps://offocestoreproduct.zll.web.core.windows.net/(typo squat 726)

hxxps://wwww.azurewebsites.net/redirect/SPWRCQ/ZGRlbnNtb3JlQGJlcmdibmVydHJlY2tpbmcuY29t (unlikely 736)

hxxps://SokuyggSogyjcs.z19.web.core.windows.net/index.htm?=en-US&username=jane.doe@contoso.com (unlikely 736)

hxxps://soso9.azurewebsites.net/jane.doe@contoso.comckowkoavranken@contoso.comfdcfcwe#jane.doe@contoso.com (unlikely 736)

hxxps://o365hdyshdquaranterror.z13.web.core.windows.net/emmmmmmg.html#john.doe@contoso.com ("0365" branding 724, "terror" sensitive 734, "hdyshdquaran" unlikely 736, "o365hdyshdquaranterror" long subdomain 722 for cutoff of twenty, "emmmmmmg" unlikely 736)

hxxps://gools.azurewebsites.net/VAZ49383DMU95210Dcontoso/contoso/contoso/contoso/contoso/contoso/contoso/contoso/#salesoffice.metropolis@contoso.com### (many directories 718 with instance threshold of 3)

Some embodiments use a trained machine learning (ML) model 414, e.g., to identify anomalous occurrences in the fully qualified domain name (FQDN). Using familiar tools and techniques of machine learning, an ML model may be trained, to identify character duplication in pseudo random strings (e.g., "adcsfscsccscsssccsbsswsysccocncovb"), to identify extremely unlikely character strings (e.g., "5okuygg5ogyjcs"), to identify atypical uses of known brands or typos thereof (e.g., "o365hdyshdquaranterror", "appple.com.aaa.g.br"), or to identify automation patterns (e.g., "ramdaan-1", "ramdaan-2", "ramdaan-4"), for example. Models 414 may be combined in parallel to check for different patterns 502, or in sequence to check for especially suspect URIs that satisfy multiple patterns 502. URI security analysis may be installed, e.g., in an email processing flow, as part of log analysis, in browsers, or as part of particular solutions such as cloud-based office productivity software-as-a-service offerings.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

CONCLUSION

In short, the teachings provided herein may be applied to computing systems 102 in a cloud 204 or elsewhere, and thereby provide cybersecurity enhancements that improve reduction or avoidance of malicious Uniform Resource Locators (URLs). In particular, some embodiments provide URL 202 security analysis tools 400 or techniques 900 which can supplement or replace subjective URL analysis 338 or URL analysis using detonation virtual machines 340. URL substrings 314 are automatically analyzed 808 for maliciousness using one or more specified malice patterns 502 which are described herein.

Some URL security analysis embodiments described herein include or are in operable communication with a memory 112 and a processor 110. The processor is configured to perform URL security analysis steps which include obtaining 802 a URL substring, automatically comparing 804 the URL substring to at least one malice pattern 502, assigning 806 a maliciousness risk indicator 308 to the URL substring based on the comparing (thus analyzing 808 the URL substring), and enhancing 810 security of a guarded system 210 based on at least the maliciousness risk indicator. Security enhancement 810 may include disallowing 908 use of the analyzed URL substring by blocking activity with it in the guarded system, or by allowing 906 use of the analyzed URL substring in the guarded system only when the maliciousness risk indicator places the analyzed URL substring in a low risk category. A system 400 may also feed 910 the analyzed URL substring and the maliciousness risk indicator back into the system, e.g., to tune a machine learning model 414.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 8 and 9 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific parsing results, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A uniform resource locator (URL) security analysis system, comprising:
   a memory;
   a processor in operable communication with the memory, the processor configured to perform static URL security analysis steps which include (a) obtaining a URL substring, (b) automatically comparing the URL substring to at least one malice pattern, the malice pattern and the comparing each directly based on both of string structure and content as opposed to being based on a result of following a link derived using the URL substring to detect what happens or being based on a preexisting domain reputation, (c) assigning a maliciousness risk indicator to the URL substring based on a result of the comparing, thereby making the URL substring an analyzed URL substring, and (d) enhancing security of a guarded system based on at least the maliciousness risk indicator by performing at least one of the following:

disallowing use of the analyzed URL substring by the guarded system when the maliciousness risk indicator places the analyzed URL substring in a high risk category, allowing use of the analyzed URL substring by the guarded system when the maliciousness risk indicator places the analyzed URL substring in a low risk category, or feeding the analyzed URL substring and the maliciousness risk indicator back into the security analysis system as at least a partial basis for security analysis of at least one other URL substring.

2. The system of claim 1, comprising at least one of the following:
 a trained machine learning model;
 a syntax rule defining a URL substring; or
 a list of URL substrings with one or more associated maliciousness risk indicator value.

3. The system of claim 1, wherein the system is further characterized in at least one of the following ways:
 the URL security analysis system avoids reliance on any detonation virtual machine as a basis for allowing or disallowing use of the analyzed URL substring by the guarded system; or
 the URL security analysis system avoids reliance on any subjective analysis by a human as a basis for allowing or disallowing use of the analyzed URL substring by the guarded system.

4. The system of claim 1, wherein the at least one malice pattern includes a predefined malice pattern.

5. The system of claim 1, wherein the at least one malice pattern includes at least one of the following predefined malice patterns:
 a punycode domain malice pattern;
 a base64 encoding malice pattern;
 a many subdomains malice pattern;
 a many directories malice pattern;
 a long subdomain or long domain malice pattern; or
 an unexpected language malice pattern.

6. The system of claim 1, wherein the at least one malice pattern includes at least one of the following predefined malice patterns:
 a homoglyph domain malice pattern;
 a sensitive key words malice pattern;
 an atypical branding malice pattern;
 a typo squatting malice pattern; or
 an unlikely string malice pattern.

7. The system of claim 1, wherein the at least one malice pattern includes at least one of the following predefined malice patterns:
 a query path malice pattern;
 a query parameter malice pattern; or
 a domain generation malice pattern.

8. The system of claim 1, wherein the malice pattern includes an inferred malice pattern.

9. A uniform resource locator (URL) security static analysis method, comprising:
 obtaining a URL substring;
 automatically comparing the URL substring to at least one malice pattern, the malice pattern and the comparing each directly based on both of string structure and content as opposed to being based on a result of following a link derived using the URL substring to detect what happens or being based on a preexisting domain reputation;
 automatically assigning a maliciousness risk indicator to the URL substring based on a result of the comparing, thereby making the URL substring an analyzed URL substring, wherein the comparing comprises at least one of the following:
  automatically determining an encoding characteristic of the URL substring,
  automatically calculating a quantitative characteristic of the URL substring,
  automatically ascertaining a rarity characteristic of the URL substring,
  automatically finding an iteration characteristic of the URL substring as a member of a set of URL substrings, or
  automatically locating a dictionary characteristic of the URL substring; and
 enhancing security of a guarded system based on at least the maliciousness risk indicator by performing at least one of the following:
  disallowing use of the analyzed URL substring by the guarded system when the maliciousness risk indicator places the analyzed URL substring in a high risk category, or
  allowing use of the analyzed URL substring by the guarded system when the maliciousness risk indicator places the analyzed URL substring in a low risk category.

10. The method of claim 9, wherein the comparing comprises automatically ascertaining a rarity characteristic of the URL substring, and wherein the ascertaining is based at least in part on at least one of the following as a context of the URL substring: a particular URL substring origin file type, or a particular URL substring origin service.

11. The method of claim 9, wherein the comparing comprises automatically determining at least one of the following encoding characteristics of the URL sub string:
 a use of punycode encoding in the URL substring;
 a use of a homoglyph in the URL substring; or
 a use of base64 encoding in the URL substring.

12. The method of claim 9, wherein the comparing comprises automatically calculating at least one of the following quantitative characteristics of the URL sub string:
 a count of subdomains in the URL substring which is above a specified subdomain count threshold;
 a count of directories in the URL substring which is above a specified directories count threshold;
 a length of a subdomain in the URL substring which is above a specified subdomain length threshold; or
 a length of a domain in the URL substring which is above a specified domain length threshold.

13. The method of claim 9, wherein the comparing comprises automatically ascertaining at least one of the following rarity characteristics of the URL substring:
 a string in the URL substring which has an occurrence likelihood below a specified string occurrence likelihood threshold;
 a pairing of a brand string and another string in the URL substring which has an occurrence likelihood below a specified brand pairing occurrence likelihood threshold;
 an unexpected natural language string in the URL substring which has an occurrence likelihood below a specified primary language string occurrence likelihood threshold;
 an unexpected natural language string in the URL substring which has an occurrence likelihood above a specified non-primary language string occurrence likelihood threshold; or a string in the URL substring has an anomalousness score assigned by a machine learning model, and the anomalousness score is above a specified rare string threshold.

14. The method of claim 9, wherein the comparing comprises automatically finding at least one of the following iteration characteristics of the URL substring as a member of a set of URL substrings:
- URL substrings in the set include a shared string and an iterating value;
- URL substrings in the set include a shared path structure with different domains; or
- URL substrings in the set include a shared path query parameter with different domains.

15. The method of claim 9, wherein the comparing comprises automatically locating at least one of the following dictionary characteristics of the URL substring:
- a string in the URL substring which is within a specified string metric distance of an entry in a dictionary of natural language words;
- a string in the URL substring which is within a specified string metric distance of an entry in a dictionary of sensitive key words;
- a string in the URL substring which is within a specified string metric distance of an entry in a dictionary of brand strings;
- a string in the URL substring which has an occurrence likelihood below a specified string occurrence likelihood threshold, based on at least one dictionary; or
- a pairing of a brand string and another string in the URL substring which has an occurrence likelihood below a specified brand pairing occurrence likelihood threshold, based on at least a dictionary of brand strings.

16. A computer-readable storage medium configured with data and instructions which upon execution by at least one processor cause one or more devices to perform a static uniform resource locator (URL) security analysis method, the method comprising:
- obtaining a URL substring;
- automatically comparing the URL substring to at least one malice pattern, the malice pattern and the comparing each directly based on both of string structure and content as opposed to being based on a result of following a link derived using the URL substring to detect what happens or being based on a preexisting domain reputation;
- assigning a maliciousness risk indicator to the URL substring based on a result of the comparing, thereby making the URL substring an analyzed URL substring; and
- enhancing security by disallowing use of the analyzed URL substring when the maliciousness risk indicator places the analyzed URL substring in a high risk category;
- wherein the method is further characterized in at least one of the following ways:
  - the URL security analysis method avoids reliance on any detonation virtual machine as a basis for disallowing use of the analyzed URL substring; or
  - the URL security analysis method avoids reliance on any subjective analysis by a human as a basis for disallowing use of the analyzed URL substring.

17. The computer-readable storage medium of claim 16, wherein the method further comprises feeding the analyzed URL substring and a label based on at least the maliciousness risk indicator into a machine learning model, thereby tuning the model for use in a subsequent analysis of at least one other URL substring.

18. The computer-readable storage medium of claim 16, wherein the method comprises comparing the URL substring to at least three of the following malice patterns:
- a punycode domain malice pattern;
- a homoglyph domain malice pattern;
- a base64 encoding malice pattern;
- a many subdomains malice pattern;
- a many directories malice pattern;
- a long domain malice pattern;
- a long subdomain malice pattern;
- an unexpected language malice pattern;
- a sensitive key words malice pattern;
- an atypical branding malice pattern;
- a typo squatting malice pattern;
- an unlikely string malice pattern;
- a query path malice pattern;
- a query parameter malice pattern;
- a domain generation malice pattern; or
- an inferred malice pattern.

19. The computer-readable storage medium of claim 18, wherein the method comprises comparing the URL substring to at least six of the malice patterns.

20. The computer-readable storage medium of claim 18, wherein the method comprises comparing the URL substring to at least ten of the malice patterns.

* * * * *